United States Patent
Brown et al.

(10) Patent No.: US 6,845,410 B1
(45) Date of Patent: Jan. 18, 2005

(54) SYSTEM AND METHOD FOR A HIERARCHICAL SYSTEM MANAGEMENT ARCHITECTURE OF A HIGHLY SCALABLE COMPUTING SYSTEM

(75) Inventors: Michael Brown, Eau Claire, WI (US); Robert Cutler, Chippewa Falls, WI (US); Martin M. Deneroff, Palo Alto, CA (US); Kim Gustafson, Sunnyvale, CA (US); Steven Hein, Chippewa Falls, WI (US); Richard T. Ingebritson, Bloomer, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/522,695

(22) Filed: Mar. 10, 2000

Related U.S. Application Data

(63) Continuation of application No. 09/425,122, filed on Oct. 22, 1999, which is a continuation of application No. 09/422,745, filed on Oct. 22, 1999, which is a continuation of application No. 09/407,429, filed on Sep. 29, 1999.

(51) Int. Cl.⁷ ............................................... G06F 3/00
(52) U.S. Cl. ............................... 710/29; 710/1; 710/7; 710/18; 710/36; 710/41; 710/100; 700/2; 700/20; 700/83; 700/108; 712/225
(58) Field of Search ............................ 710/1, 18, 7, 29, 710/36, 41, 100; 700/2, 20, 108, 83; 712/225

(56) References Cited

U.S. PATENT DOCUMENTS

| | | | |
|---|---|---|---|
| 5,161,110 A | * | 11/1992 | Dorchak ..................... 700/108 |
| 5,291,480 A | * | 3/1994 | Nimon ....................... 370/58.1 |
| 5,471,313 A | * | 11/1995 | Thieret et al. .............. 359/296 |
| 5,544,161 A | * | 8/1996 | Bigham et al. ............. 370/58.1 |
| 5,651,110 A | * | 7/1997 | Powers et al. ............ 395/182.05 |
| 5,845,148 A | * | 12/1998 | Ichikawa et al. ........... 395/828 |
| 5,907,559 A | * | 5/1999 | Shuman et al. .............. 370/539 |

* cited by examiner

Primary Examiner—Fritz Fleming
Assistant Examiner—Justin Knapp
(74) Attorney, Agent, or Firm—Schwegman, Lundberg, Woesser & Kluth, P.A.

(57) ABSTRACT

A modular computer system includes at least two processing functional modules each including a processing unit adapted to process data and adapted to input/output data to other functional modules through at least two ports with each port including a plurality of data lines. At least one routing functional module is adapted to route data and adapted to input/output data to other functional modules through at least two ports with each port including a plurality of data lines. At least one input or output functional module is adapted to input or output data and adapted to input/output data to other functional modules through at least one port including a plurality of data lines. Each processing, routing and input or output functional module includes a local controller adapted to control the local operation of the associated functional module, wherein the local controller is adapted to input and output control information over control lines connected to the respective ports of its functional module. At least one system controller functional module is adapted to communicate with one or more local controllers and provide control at a level above the local controllers. Each of the functional modules adapted to be cabled together with a single cable that includes a plurality of data lines and control lines such that control lines in each module are connected together and data lines in each unit are connected together. Each of the local controllers adapted to detect other local controllers to which it is connected and to thereby collectively determine the overall configuration of a system.

27 Claims, 14 Drawing Sheets

SYSTEM AND METHOD FOR A HIERARCHICAL SYSTEM MANAGEMENT ARCHITECTURE OF A HIGHLY SCALABLE COMPUTING SYSTEM

CROSS-REFERENCE TO RELATED APPLICATIONS

This application is a continuation of U.S. patent application Ser. No. 09/407,429 filed Sep. 29, 1999, a continuation of U.S. patent application Ser. No. 09/425,122 filed Oct. 22, 1999, and a continuation of U.S. patent application Ser. No. 09/422,745 filed Oct. 22, 1999.

FIELD OF THE INVENTION

This invention relates generally to computer communications, and more particularly to control and communication of highly scalable and massively parallel computing systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Silicon Graphics Incorporated, All Rights Reserved.

BACKGROUND OF THE INVENTION

Conventionally, scalable parallel computing systems have management control software that is not scalable, and in which there are decreasing economies of scale as the number of computing units in the system increases. As the number of computing units in the parallel computing system increases, the overhead communications traffic increases not just geometrically, but in some cases, exponentially, creating increasing overhead burden in which an increasing amount of processing power is used merely by communicating between the computing units, and a proportionately lesser amount of processing power is available to support the application. Thus, the system management for scalable parallel processing systems have diminishing returns in terms of performance and cost. As a result, there is a need for system management software for scalable parallel processing systems that yields increasing scales of economies as the number of computing units is the system increases.

SUMMARY OF THE INVENTION

The above-mentioned shortcomings, disadvantages and problems are addressed by the present invention, which will be understood by reading and studying the following specification.

A modular computer system according to one example embodiment of the invention provides a system controller in each functional module of the system, and one or more stand-alone controllers at higher levels of a hierarchy defined by the controllers in the functional modules and the stand alone controllers. The controllers of the functional modules are cabled together using the same cable as used to carry data to be processed between functional modules, to facilitate error free intercabling. Controllers are adapted to provide system management and maintenance capabilities, and to automatically determine the configuration of the system. These and other aspects and embodiments of the invention are described herein below.

System management software for a scalable parallel processing system controls the computing units in various levels, in which subsets of computing units are controlled in increasingly larger aggregations from one level to higher levels, and ultimately, the entire scalable parallel processing system is controlled by one controller.

Each computing unit may have an embedded control system. Communication modules executing in the embedded control system include at least one device specific module for each computing unit. The device specific module defines requirements for communication with a device, and a device independent module including a library of functions executed to perform operations specified by the device specific module for communication with the device.

A scalable server in which the computing units are controlled in a plurality of aggregating levels of control, in which the apparatus that controls each level is operated by program code that interacts with the program code through a predefined communication interface that is common to all of the levels. Communication between the levels of control is accomplished using a set of packets that is common between all levels of control within the scalable server. The packets are transmitted using a device independent module, including a library of functions, in the controller of each computing unit. Device dependent modules are provided for each communication route. The device dependent modules specify function(s) in the device independent module and the arguments to be used. The device independent module executes the function(s) to send and receive information to via the communication routes available to the computational unit.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of an embodiment of the invention is presented. In the third section, exemplary embodiments of the invention are provided. In the fourth section, two- and three-level implementations of the invention are described. Finally, in the fifth section, a conclusion of the detailed description is provided.

Hardware and Operating Environment

Figure 1A:
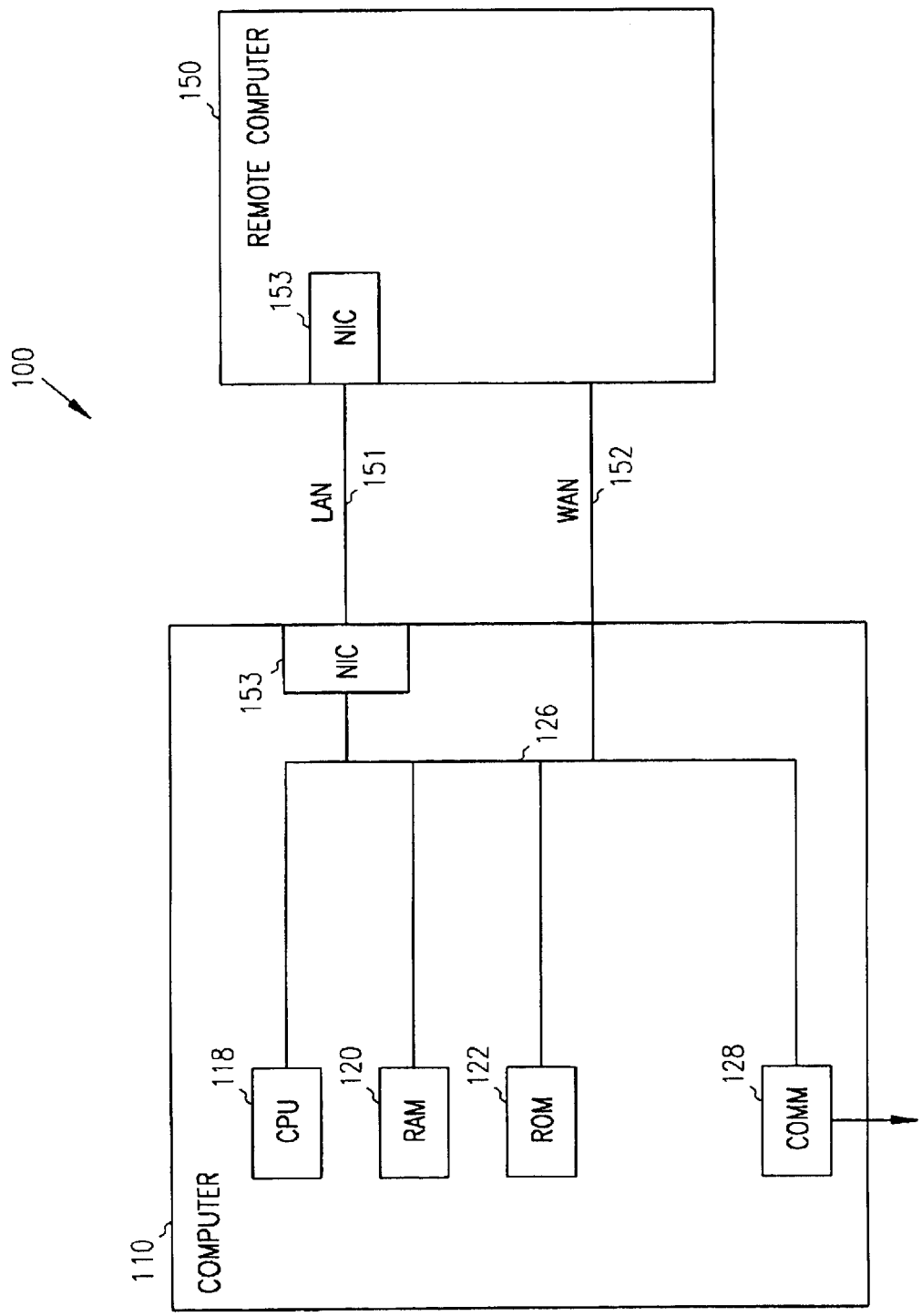
FIG. 1A is a block diagram of the hardware and operating environment in which different embodiments of the invention can be practiced.

FIG. 1A is a block diagram of the hardware and operating environment 100 in which different embodiments of the invention can be practiced. The description of FIG. 1A provides an overview of computer hardware and a suitable computing environment in conjunction with which the invention can be implemented. Embodiments are described in terms of a computer executing computer-executable instructions. However, these embodiments can be entirely implemented by computer hardware in which the computer-executable instructions are stored in read-only memory. These embodiments can also be implemented in client/server computing environments where remote devices that are linked through a communications network. Program modules can be located in both local and remote memory storage devices in a distributed computing environment.

Computer 110 includes one to four processors 118 (e.g. an Intel Pentium processor), random-access memory 120 (RAM), read-only memory 122 (ROM) and a system bus 126, that operatively couples various system components including the system memory to the processing unit(s) 118. Mass storage devices are more specifically types of non-volatile storage media and can include a hard disk drive, a floppy disk drive, an optical disk drive, and a tape cartridge drive. The memory 120 and 122 are types of computer-readable media. The processor(s) 118 executes computer programs stored on the computer-readable media. The invention is not limited to any type of computer 110. Computer 110 can be a PC-compatible computer, a MacOS-compatible computer or a UNIX-compatible computer. The construction and operation of such computers are well known within the art. Furthermore, computer 110 can be communicatively connected to the tiered system via a communication device 128. Communication device 128 communicates via a PPP (point-to-point) connection. In one embodiment, communication device 128 is connected via an RS-232 communication medium. In another embodiment, The connection is an Ethernet or similar hardware (network) card connected to a local-area network (LAN) that itself is connected to the Internet via what is known in the art as a "direct connection" (e.g., T1 line, etc.).

Computer 110 also has at least one operating environment running thereon, each desirably providing a graphical user interface including a user-controllable pointer. Such operating environments include operating systems such as versions of the Microsoft Windows and Apple MacOS operating systems well-known in the art. The invention is not limited to any particular operating environment, however, and the construction and use of such operating environments are well known within the art. Computer 110 also desirably can have at least one web browser application program running within at least one operating environment, to permit users of computer 110 to access intranet or Internet world-wide-web pages as addressed by Universal Resource Locator (URL) addresses. Such browser application programs include Netscape Navigator and Microsoft Internet Explorer.

The computer 110 can operate in a networked environment using logical connections to one or more remote computers, such as remote computer 150. These logical connections are achieved by a communication device coupled to, or a part of, the computer 110; the invention is not limited to a particular type of communications device. The remote computer 150 can be another computer 110, a server, a router, a network PC, a client, a peer device or other common network node. The logical connections depicted in FIG. 1A include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the personal computer 110, or portions thereof, can be stored in the remote memory storage device.

Overview of System Components

A system level overview of the operation of an exemplary embodiment of the invention is described by reference to FIG. 2. The concepts of the invention are described as operating in a multi-processing, multi-threaded operating environment on a computer, such as computer 110 in FIG. 1A.

Figure 1B:
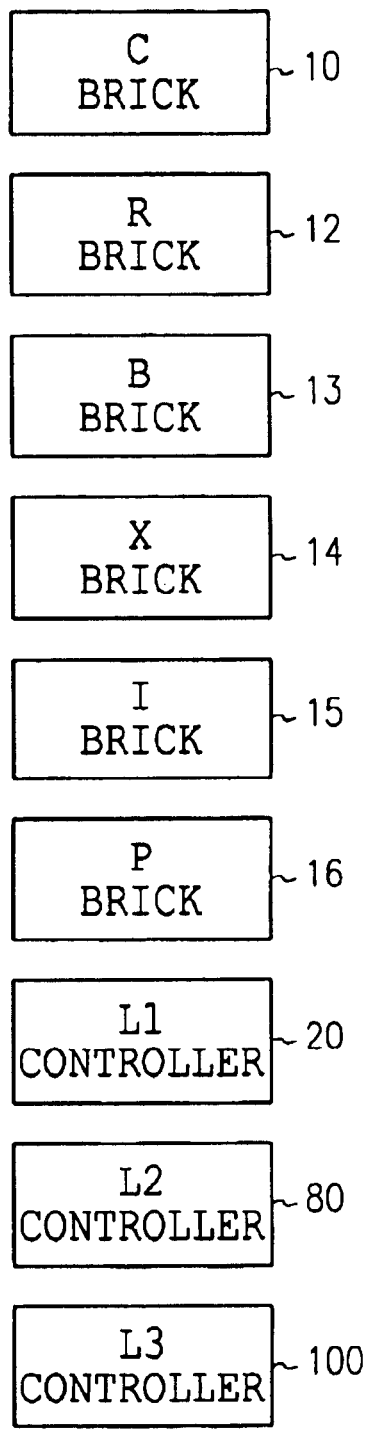
FIGS. 1B, 1C, 1D and 1E illustrate system components according to one example embodiment of the invention.

Referring to FIG. 1B, there is shown an overview of the computer system components utilized in various embodiments of the invention. In the present invention, electronic computer units are referred to as "bricks" because these units are the basic building blocks of the scalable system. Bricks can be combined in any combination or configuration according to the performance and cost, and space requirements of the application. The system includes "C" bricks 10 that are the computational units which execute application programs, "R" bricks 12 that route data between devices, "B" bricks 13 which perform graphics processing, "X" expansion bricks 14 that extend communication of other bricks to Crosstalk Input/Output (XIO) devices, and "I" and "P" bricks 15 and 16, respectively, that interface other bricks to input/output (I/O) devices such as mass storage devices. Further information concerning these bricks may be found in co-pending U.S. application Ser. No. 09/408,874, entitled "MODULAR COMPUTING ARCHITECTURE HAVING COMMON COMMUNICATION INTERFACE" filed Sep. 29, 1999, owned by the same assignee of the present application, the entire discourse of which is incorporated herein by reference.

As is illustrated in FIG. 1B, the present invention also includes controllers to aggregate control of the bricks in a hierarchy of levels. In one embodiment, the controllers at the first level are referred to as "L1" controllers 20, the controllers at the second level are referred to as "L2" controllers 80, the controllers at the third level are referred to as "L3" controllers 100, and so on in the case of higher level controllers. There is no limit to the number of levels in a scalable system. There is one L1 controller 20 for each brick and they are physically mounted inside the same housing, and share a common bus and a power supply with the brick. There will be one L1 controller 20 in every C, B, R, I, P, and X brick. The L1 controller 20 in one embodiment is physically implemented on a node board in the C-brick and on a power board in all other bricks. For all other levels, the controller is in a separate box with it's own power supply and internal bus.

As described in more detail below, the L1 controller 20 is the brick-level system controller. It provides direct low level communications and control for all of the control functions within a brick. In most system configurations as described below more fully, it acts as a slave to an upstream L2 controller 80, which directs all of the L1 controller 20's actions. However, in one example embodiment having systems which are limited to a maximum of two C-bricks and two IO (I, K or X) bricks ("S Class"), one L1 controller 20 will act as the master controller for the entire system if no L2 controller 80 is present. As described more below, in one embodiment, each L1 controller 20 is equipped with a 2 line×12 character alphanumeric display, which is used to display messages and console information.

Figure 1C:
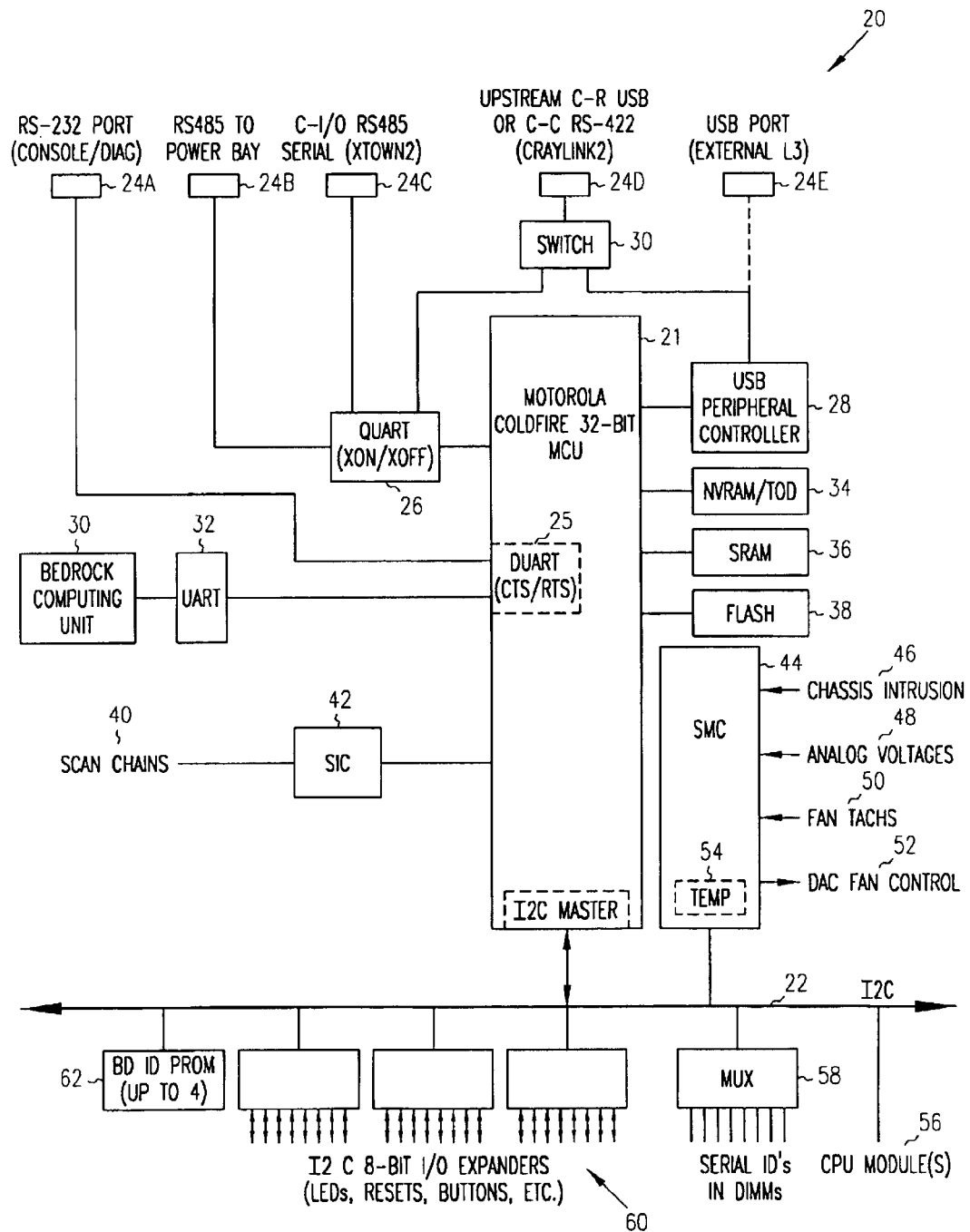

Referring to FIG. 1C, there is shown in more detail a block diagram of a L1 system controller 20 for use in a C brick according to one embodiment of the invention. As illustrated, L2 controller 80 interfaces with the main processing, routing, expansion and/or I/O functionality of the brick through I2C bus 22 and bedrock computing unit 30, which is described in the aforementioned patent applications. L1 controller 20 includes a CPU 21, for example a Motorola ColdFire brand 32-bit MCU, connected to an I2C bus 22 of a C brick. Controller 20 includes a plurality of ports 24, including a RS-232 port 24a for connection to a console display for displaying diagnostic and other information, a RS485 port 24b for connection to a system power bay, an RS485 port 24c for connection to an I/O brick, a RS-422 or USB port 24d for connection, in the case of the RS-422, to another C brick, or, in the case of the USB, to an R brick, and, lastly, a USB port 24e for connection to an external L3 controller 100. As illustrated, port 24a is connected to CPU 21 through an on board DUART 25. Ports 24b, 24c and the RS-422 portion of port 24d are connected to CPU 21 through QUART 26, and the USB portion of port 24d and port 24e are connected to CPU 21 through USB peripheral controller 28. As shown, a switch 30 provides for switching port 24d between QUART 26 and controller 28 depending on which port connection is required. CPU 21 further provides a connection to bedrock computing unit 30 through UART 32. As also shown, CPU 21 is connected to nonvolatile RAM 34, SRAM 36 and FLASH memory 38. Finally, CPU 21 is connected to four scan chains 40 through SIC 42.

As further illustrated in FIG. 1C, a SMC 44 is connected to bus 22 and provides an interface to a chassis intrusion signal 46, analog voltage signals 48, fan tach signals 50, and a DAC fan control output signal 52. In addition, a temperature monitoring circuit 54 is included in SMC 44. Accordingly, CPU 21 may access SMC 44 over bus 22. Bus 22 is also connected to CPU modules 56 for use in processing data, a mux 58 connected to read the serial ID's in DIMMs on the C brick, one or more I2C 8-bit I/O expanders 60, for example for LED's, resets and buttons, and up to four Bd ID PROMS 62.

The L1 controller 20 provides the following functionality: fan control/monitoring, temperature monitoring, voltage control/monitoring, power sequencing, console/diagnostics access, JTAG scan interface, all levels of power, reset, NMI control, read all system ID EEPROMS (replacement for the NICs used in Origin), read node board DIMM serial ID PROMS, control LED's and read all LED states, FLASH updatable firmware, NVRAM storage, time of day (TOD), control remote power OK signal which is transmitted across interconnect cables, implement high speed serial link to bedrock computing unit 30 (in C-Brick) or the router (not shown in R-Brick), implement RS485 ICMB interface to allow monitoring of SSI Power Bay, implements RS485 ICMB interface between L1 in C-bricks and L1 in IO (I, P, or X) bricks to allow hierarchical control of the L1s in the IO Bricks, implements slot power control for Hot Plug PCI in the I and P-Bricks, and totals available power versus the required power in I and P-bricks and performs selective power control to hold consumption within safe limits.

The L1 controller 20 will also monitor the following buttons: power On/Off, reset and, NMI (implemented for C-brick only). The L1 controller 20 will also monitor all LEDs in a brick, and control some such as 48 VDC OK, DC OK (on/off), brick failure, and fan failure (one per fan, for example). In addition, the L1 controller 20 will monitor, and in some cases control, rear panel LEDs. In one example embodiment, these LEDs indicate specific operating or failure conditions, such as "Link Failure". The rear panel LEDs are specific to the functionality of each brick. In one example embodiment, all bricks containing L1 controllers 20 shall have a small alphanumeric display (2 lines×12 characters) on its front panel for use in displaying diagnostic and informational messages in systems which do not contain an L2 controller 80. And, each C, R, and B-brick have a DB-9 console port on its front panel. In addition, the R-brick has a USB slave port for connection to the L2 controller 80. According to another example embodiment, the C-brick may also have a USB slave connector which allows directly connecting to it from an L3 controller 100 if it is not being driven by an L2 controller 80 via a router. Other channels, such as USB and RS-485, will be routed through the CrayLink2 and XTown2 cables.

The L2 controller 80 is the rack-level system controller. It is responsible for providing the user with the single point of access for larger systems, as well as enhanced monitoring/control and remote support capabilities. In one example embodiment, the L2 controller 80 is more powerful than the L1 controller 20, and has a single-board computer capable of running an embedded OS, such VxWorks, out of FLASH memory. According to one example configuration, there will be one L2 in every rack which contains C-bricks, with the exception of systems with only two C-bricks ("S Class"), where an L2 controller 80 is optional. According to one example embodiment of the invention, a L2 controller 80 is required if there is a R-brick in the system, if there is a D-brick and remote control of that brick is desired, if there is a B-brick, if remote maintenance of the system is required, or if a rack display is desired.

Figure 1D:
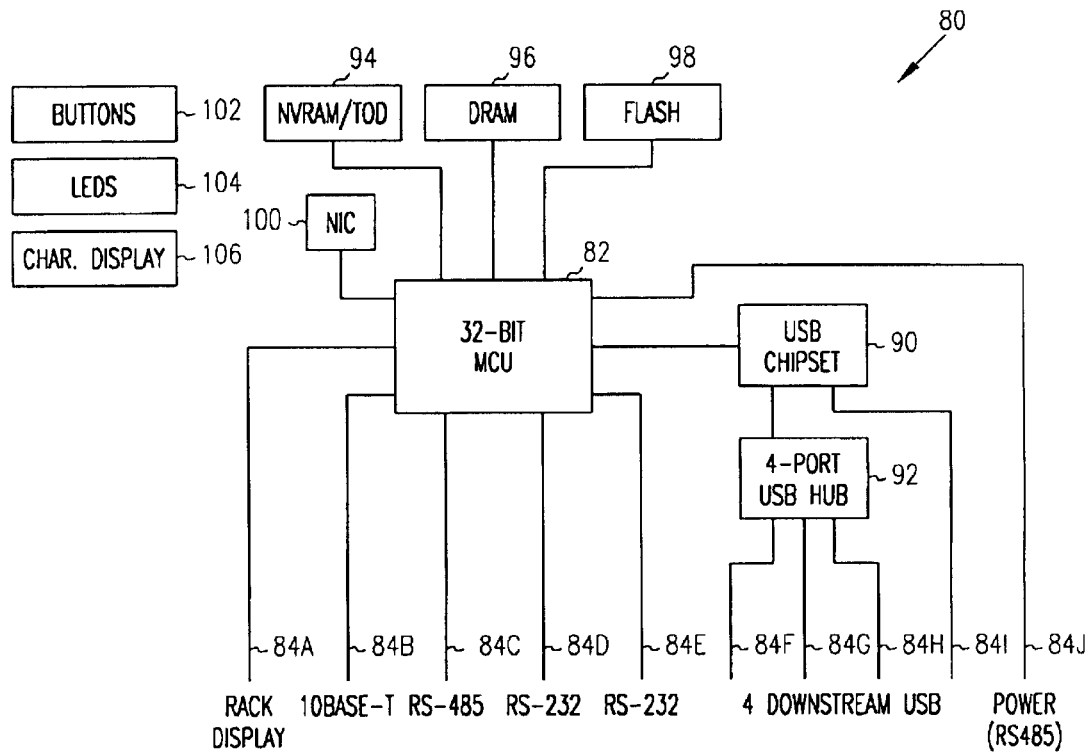

Referring to FIG. 1D there is illustrated an example embodiment of an L2 controller 80 according to the present invention. L2 controller 80 includes a 32-bit MCU 82, for example a Motorola ColdFire brand 32-bit CPU. L2 controller 80 includes a plurality of ports 84a–e, providing, respectively, connectivity to a rack display, 10Base-T, RS-485, and a pair of RS-232's. A USB chipset 90 and a 4-port USB hub 92 provide four downstream USB ports 84f–i. In addition, a port 84j is provided to connect to power with an RS-485. As also shown, MCU 82 is connected to nonvolatile RAM 94, SRAM 96 and FLASH memory 98, and includes a NIC connection 100. Finally, buttons 102, LED's 104 and a character display 106 are connected with MCU 82.

Thus, the L2 controller adds the following features to a system: system single point of access for larger systems, remote support (RS-232 input for an external modem), interface for a rack-level display, RS-485 port for IPMI compatibility, firmware is FLASH updatable. As also illustrated above, the L2 controller 80 provides four standard downstream USB ports, a 10Base-T port (RJ-45), two RS-232 ports, a RS-485 port—IPMI, and a port for rack display. Features and functionality of the rack display are: system single point of access, system performance analysis, touch screen function. In one example embodiment, the L2 controller 80 is physically mounted in the top of the rack, outside of the rack's normal configurable space.

Figure 1E:
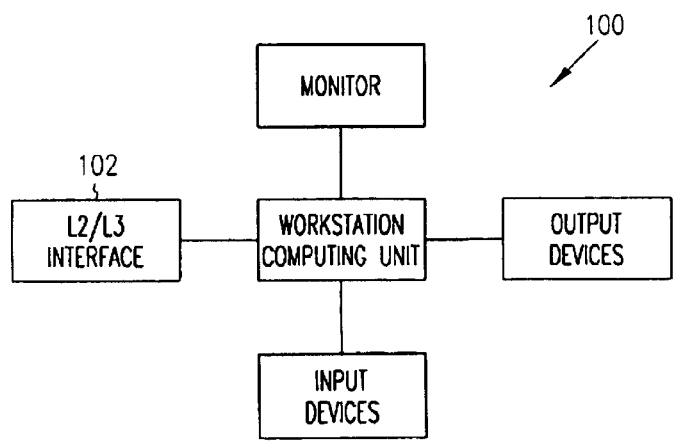

Referring to FIG. 1E there is illustrated an example embodiment of a L3 controller 100. In this embodiment, L3 is a stand-alone Windows NT workstation or laptop computer. In one embodiment, it has interfaces 102 with the L2 controllers 80 via a 10Base-T ethernet on a private network, or, in a system without a L2 controller 80, with L1 controllers 20 via a USB, as described in more detail below. The L3 controller 100, in one example embodiment, adds the following features to a SN-1 system: comprehensive JTAG, boundary-scan interconnect test, scan-based at-speed router test, scan interface tool, scan-based debugging, system single point of access, and system performance analysis. In one embodiment, a L3 controller 100 is expected to have two 10Base-T ethernet ports, one of which supports the private system control network and one of which may be connected to a general purpose LAN, and two USB ports. In a example system one or more L2 controllers so, the L3 controller 100 uses the private ethernet to communicate with the rest of the system. In a system which has no L2, the L3 controllers can directly control the L1 controllers, 80 in up to two C-bricks via USB, as is shown in more detail below.

Overview of System Control Functionality

As described above in part, each controller L1 is adapted for a particular type of brick. This functionality is summarized below.

Functions Common to all Bricks

The following functions are performed in all bricks in the system which contain L1 controllers 20:

Report state of all LEDs in system to remote or local console under software control.

Report all failure conditions to local or remote console under software control.

Monitor and control fan speed; light failure indicator for failed fan.

Control and sequence DC power output of voltage regulators; monitor for failures and report them; drive DC ON, FAILURE leds.

Monitor and report operating temperature and status of 48VDC input power.

Drive RESET signal to local electronics on command from software.

Read and write contents of module identification EEPROMS (serves same function as NICs in Origin products).

Control JTAG boundary scan.

Log information in NVRAM.

Control voltage margining within the brick on command from software.

Functions Specific to C-Brick

The following additional functions are provided in the C-Brick:

Provide a high speed serial channel to communicate between the system controller network and the bedrock computing unit ASIC.

Provide a high speed serial channel to communicate with the L1 in a second C-Brick in routerless systems.

Provide an external high speed serial console port for use in routerless systems.

Provide a serial channel to communicate with the L1 in an IO brick (I<K<or X).

Monitor and act on the state of the POWER, RESET, and NMI buttons.

Drive the RESET, SOFT RESET, and NMI signals to the node electronics.

Read and report the memory and processor configuration within the node.

Provide a USB slave port to communicate with upstream L2 and L3 system controllers.

Drive the C-Brick display.

Drive the outgoing REMOTE POWER OK signals on the Duplonet and XTown2 connectors; receive the incoming REMOTE POWER OK signals from the Duplonet and XTown2 connectors; drive the Link Enable inputs for the Duplonet and XTown2 ports on bedrock computing unit based on the state of these signals and commands from software.

Control and monitor the status of an SSI power bay.

Functions Specific to R-Brick

The following additional functions are provided in the R-Brick:

Provide a high speed serial channel to communicate between the system controller network and the Router ASIC.

Provide a USB slave port to communicate with upstream L2 and L3 system controllers.

Provide a USB hub with 5 master ports; one port connects internally to the router L1; the other four ports drive out on the four Duplonet ports which are designated for connection to nodes.

Drive the outgoing REMOTE POWER OK signals on the Duplonet connectors; receive the incoming REMOTE POWER OK signals from the Duplonet and connectors; drive the Link Enable inputs for the Duplonet and ports on the Router ASIC based on the state of these signals and commands from software.

Provide secure control over enabling and disabling of the two router ports used for inter-rack communication in order to limit system expansion to the limits set by the customer's license.

Functions Specific to I and P-Bricks

The following additional functions are provided in the I and P-Bricks:

Provide a serial channel to communicate with the L1 in a C-Brick.

Read and report the population of PCI cards and their power levels in slots; calculate the power requirements of installed cards and compare to the available power. Determine which slots will be powered up based on this calculation and an enable vector provided by software.

Control the powering of PCI slots and the LEDs associated with those slots on command from software, in order to implement the functionality of Hot Plug PCI.

Drive the outgoing REMOTE POWER OK signals on the XTown2 connectors; receive the incoming REMOTE POWER OK signals from the XTown2 connectors; drive the Link Enable inputs for the XTown2 ports on XBRIDGE based on the state of these signals and commands from software.

Control and monitor the status of an SSI power bay.

Functions Specific to X-Brick

The following additional functions are provided in the X-Brick:

Provide a serial channel to communicate with the L1 in a C-Brick.

Read and report the population of XIO cards.

Drive the outgoing REMOTE POWER OK signals on the XTown2 connectors; receive the incoming REMOTE POWER OK signals from the XTown2 connectors; drive the Link Enable inputs for the XTown2 ports on XBRIDGE based on the state of these signals and commands from software.

Control and monitor the status of an SSI power bay.

Overview of System Architecture

A system level overview of the operation of various exemplary configurations of the system of the present invention is described by reference to FIG. 2A.

System 200 includes computing units such as C bricks, I bricks and L1, L2 and L3 controllers. C bricks 205, 210, 215, 220, 225, 230 communicate to the scalable system via L1 controllers 235, 240, 245, 250, 255, 260, respectively. C bricks 205, 210, 215, 220, 225, 230 can be optionally connected to I brick 265 through L1 controller 270.

A controller above the first level can control any number of controllers at the next lowest level. For example, a L2 controller can control one L1 controller as in: C brick 205 and L1 controller 235 are controlled by L2 controller 275. Furthermore, a L2 controller can control two L1 controllers as in: C bricks 210 and 215 and L1 controllers 240 and 245 are controlled in aggregate by L2 controller 280. Moreover, a L2 controller can control three L1 controllers as in: C bricks 220, 225 and 230 and L1 controllers 250, 255 and 260 are controlled in aggregate by L2 controller 280.

Moving further up the hierarchy, the L3 controller 290 controls L2 controllers 275 and 280 in aggregate and L3 controller 293 controls L2 controller 285. Lastly, L4 controller 296 controls L3 controllers 290 and 293 in aggregate. A scalable system may be architected with any number of levels according to the cost, performance and space considerations of the application.

Figure 2A:
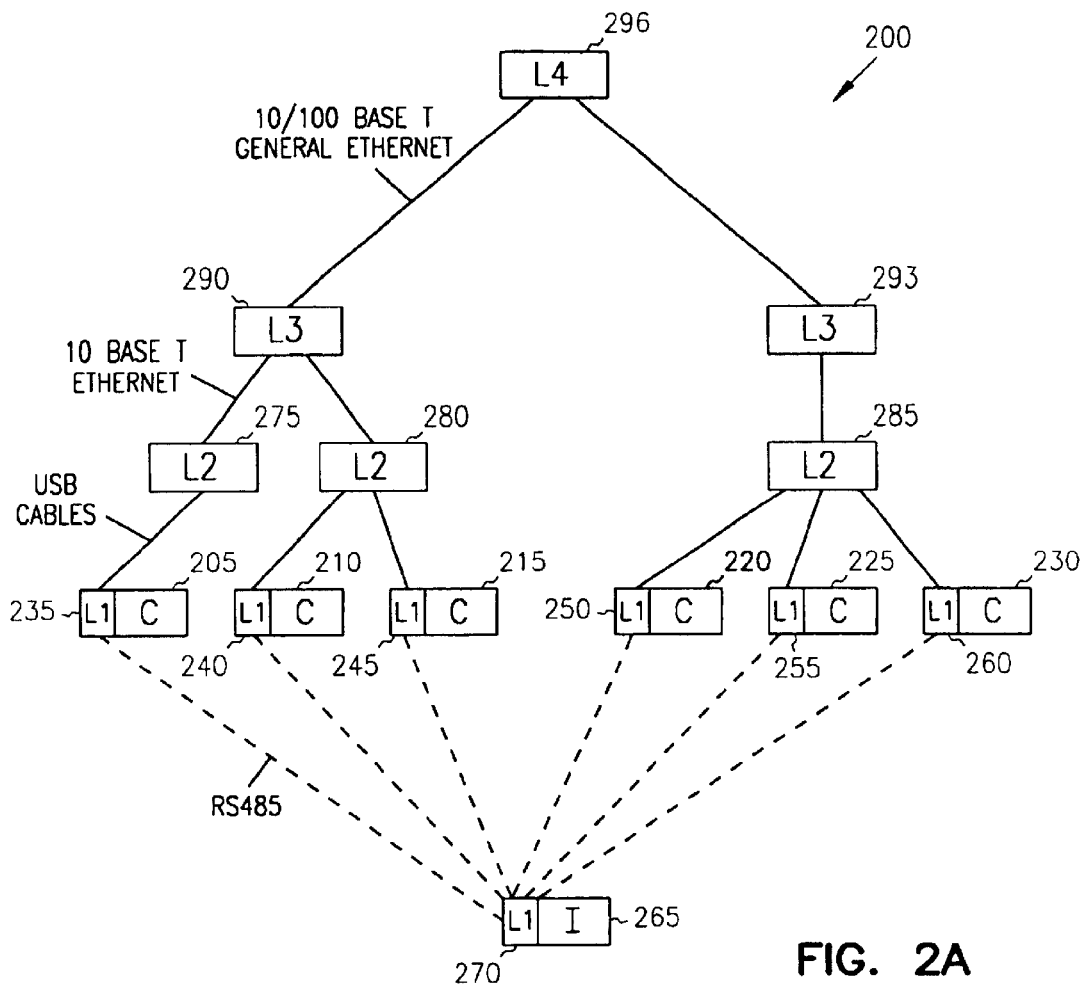
FIGS. 2A and 2B illustrate a system-level hierarchy of an exemplary embodiment of the invention.
Figure 2B:
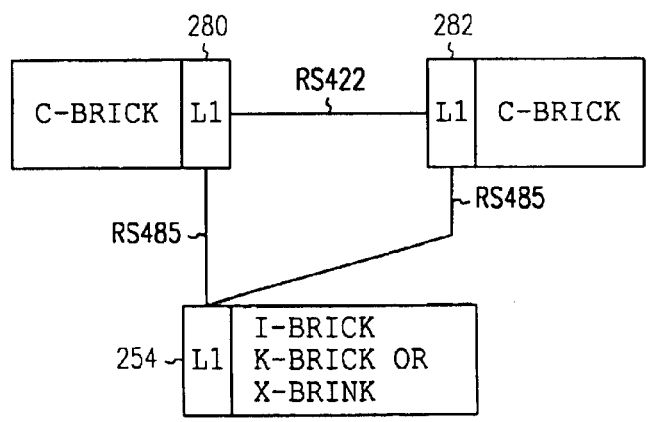

In one embodiment shown in FIG. 2B, controllers 280 and 282 at a particular level are interconnected and communicate as peers within the level, and one L1 controller 280 is designated as the "master" controller within that level and in which the master controller for that level asserts control. In addition, L1 controllers are shown connected to L1 controller 280 for an I, K or X-brick. In another embodiment, a controller at a particular level is omitted and the controller at the next highest adjacent level communicate with the lower level controllers by using software that emulates the function of the omitted controller.

The present invention provides flexibility to produce computer systems in many different configurations. For example, in one configuration controllers at a particular level, such as L1 or L2, are interconnected and communicate as peers within the level (not shown). In this configuration a controller at a level is designated as the "master" controller within that level and in which the master controller for that level asserts control over the other controllers at that level. In another configuration, a controller at a particular level, such as L2, is omitted and the controller at the next highest level, such as L3, communicates with the lower level (L1) controllers by using software that emulates the function of the omitted controller.

The system level overview of the operation of an exemplary embodiment of the invention has been described in this section of the detailed description of a scalable multiple-unit server. While the invention is not limited to any particular combination of bricks, for sake of clarity a simplified implementation of multiple C bricks and an I brick has been described.

Connection of Controllers

FIGS. 2A and 2B illustrate the hierarchial system controller of the present invention. According to one aspect of the invention, controllers have hierarchical, local control, so that the controller architecture scales well and doesn't degrade in performance as the system gets big. According to one embodiment of the invention, the controller communication links are in the same cables that carry the high speed data between bricks, so that as the topology of the system is reconfigured, the topology of the controller network is simultaneously reconfigured so that there is less chance of configuration errors occurring were things misconnected or not connected in the same way. This feature provides the ability to track what the system configuration is in a reasonable way. This addresses one problem of a modular system, that is, that it has so many possible ways it can be hooked up that a mechanism for automatically detecting the configuration is useful. This feature, again, is facilitated by the use of the same cables to carry control signaling and data in the data channels. Thus, whatever way data channels are hooked up, the system controllers are similarly hooked up. According to one embodiment, the controllers are adapted with software to then sort out the way the data channels actually are hooked up. According to this aspect of the invention, therefore, one example embodiment provides that the same cable connecting the data channels of the I/O bricks also includes the RS-485 interface lines, the same cable carrying the data channels between C-bricks and R-bricks carries the USB lines, and the same cable carrying the data channels between C-bricks in an S Class system carries the RS-422 lines.

The system as illustrated in FIGS. 2A and 2B, and later in other figures discussed below, also includes the use of different carrier mediums between levels of hierarchy. For example, as shown in FIG. 2A, the L1 controller 270 in the I-brick 265 is connected over an RS-485 connection (which, in one embodiment, implements an RS-232 connection), while the connection from L1 controller 235 to L2 controller 275 is provided with a USB connection. In turn, the connection to the L3 controller is over a 10BaseT ethernet connection, and further, the connection from the L3 controller 290 to L4 controller 296 is over a 10/100 BaseT connection. As such, the hierarchy of controller connections provides for ever increasing capacity and speed as levels of hierarchy are moved up. In the example embodiment of FIG. 2B, L1 controllers 280 and 282 are connected with an RS-422 connection, which is one preferred approach for systems with only two C-bricks. L1 controllers 280 and 282 are each connected to an I, K or X-brick through a RS-485 connection, similar to that shown with respect to FIG. 2A.

Methods of an Exemplary Embodiment of the Invention

In the previous section, a system level overview of the operation of an exemplary embodiment of the invention was described. In this section, the particular methods performed by the controllers at multiple level of such an exemplary embodiment are described by reference to a series of flowcharts. The methods performed by the controller constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Methods illustrated in FIG. 3 through FIG. 12 are performed by a controller program executing on a computer, such as computer 110 in FIG. 1A.

Figure 3:
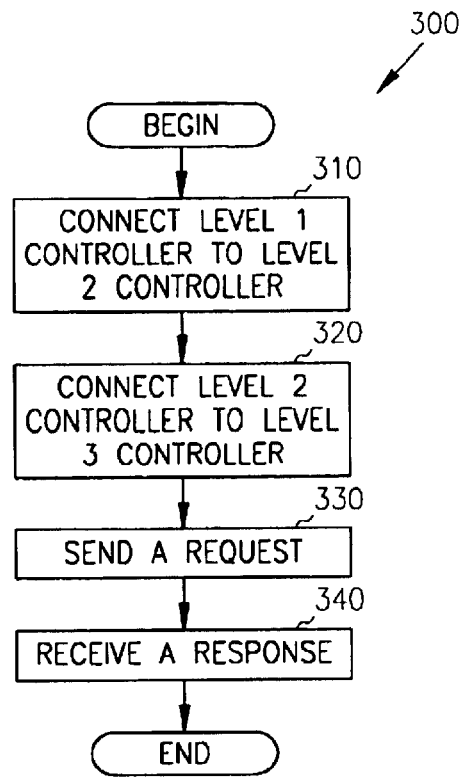
FIG. 3 is a flowchart of a method according to an embodiment of the invention.

Referring first to FIG. 3, a flowchart of a method 300 performed by controllers according to an exemplary embodiment of the invention is shown. Method 300 begins with connecting one or more level one controllers to a level two controller 310. One or more additional level one controllers can be operably connected to additional level two controllers. In one embodiment, each of the level one controllers can be operably connected to the level one controllers that are operably connected to a common level two controller. In another embodiment, level two controllers are connected to a level two controller that the level one controllers are not connected to in common.

Level two controllers are also connected a level three controller 320. Action 320 may be performed before, during, or after action 310. Likewise in action 310, one or more additional level two controllers can be operably connected to additional level three controllers. In one embodiment, each of the level two controllers are operably connected to the level two controllers that are operably connected to a common level three controller. In another embodiment, a level two controller is operably connected to level two controllers that are connected to a level three controller that the level two controller is not connected to in common.

Thereafter, the method sends a request from one of the controllers to a controller at a different level 330. In one embodiment, a level one controller transmits a request to a level two or a level three controller. In another embodiment, a level two controller transmits a request to a level one controller or a three controller. In yet another embodiment, a level three controller transmits a request to a level one or a level two controller. In still another embodiment, a controller send a request to a controller at the same level. In still yet another embodiment, the request is transmitted by after having received, and in response to, a transmission from any one of an input/out computing unit, a processor computing unit, a system management computing unit, a routing computing unit, or another controller. In another embodiment, the request is transmitted by a second level controller or a third level controller after having received, and in response to, a transmission from a system management computing unit or another controller.

Subsequently, the controller that initiated the request receives a response to the request from the controller that received the request 340. The response is acted upon by the controller that initiated the request, and the method 300 ends.

In another embodiment of method 300, a system of two individual computing units are controlled by connecting each of two level one controllers associated with an individual computing unit to a level three controller. The level three controller includes software that emulates a level two controller at the interface with the level one controller. Then, either a request from one of the level one controllers is sent to the level three controller or a request is sent from the level three controller to the level one controller. Thereafter, the request is received by the destination controller, and the destination controller transmits a response to the initiating controller.

The particular methods performed by a scalable tiered computing system of an exemplary embodiment of the invention have been described. The method performed by a scalable tiered computing system has been shown by reference to a flowchart including all the acts from the connection of the controllers in levels until the receipt of response information.

Figure 4:
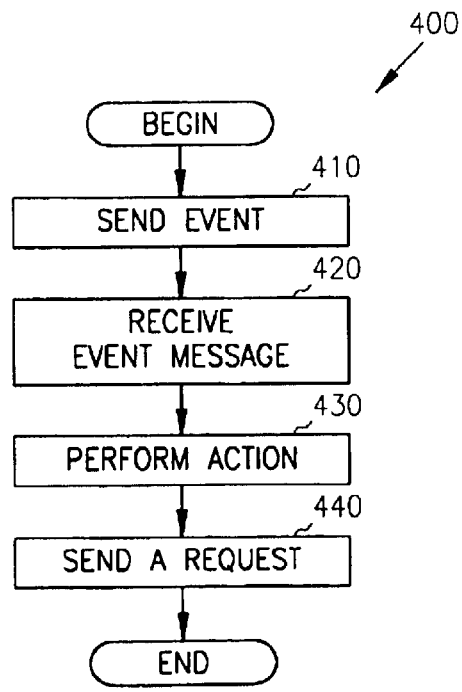
FIG. 4 is a flowchart of a method according to an embodiment of the invention.

Referring next to FIG. 4, a flowchart of a method 400 performed by a client according to an exemplary embodiment of the invention is shown. In one embodiment, the actions of method 400 are auxiliary to the actions of method 300.

Method 400 begins and thereafter an event message is broadcast to all controllers in the system 410. In another embodiment, the message is broadcast to all controllers at a higher level than the initiating controller. In yet another embodiment, the message is broadcast to all controllers at the same level as the initiating controller in the system. In still another embodiment, the message is broadcast to all controllers at a different level as the initiating controller in the system. Thereafter, the message is received by all controllers in the system 420. In another embodiment, the message is received by all controllers at a higher level that the initiating controller. In one embodiment, when the message is received, it is stored in a queue as a received event message. Thereafter, the receiving controller(s) perform an action appropriate to the event message in response to the received event message 430. The method also includes the transmission of a request by a controller to a controller at the same level in the system.

The particular methods performed by a scalable tiered computing system of an exemplary embodiment of the invention have been described. The method performed by a scalable tiered computing system has been shown by reference to a flowchart including all the acts from sending an event until sending a request.

Figure 5:
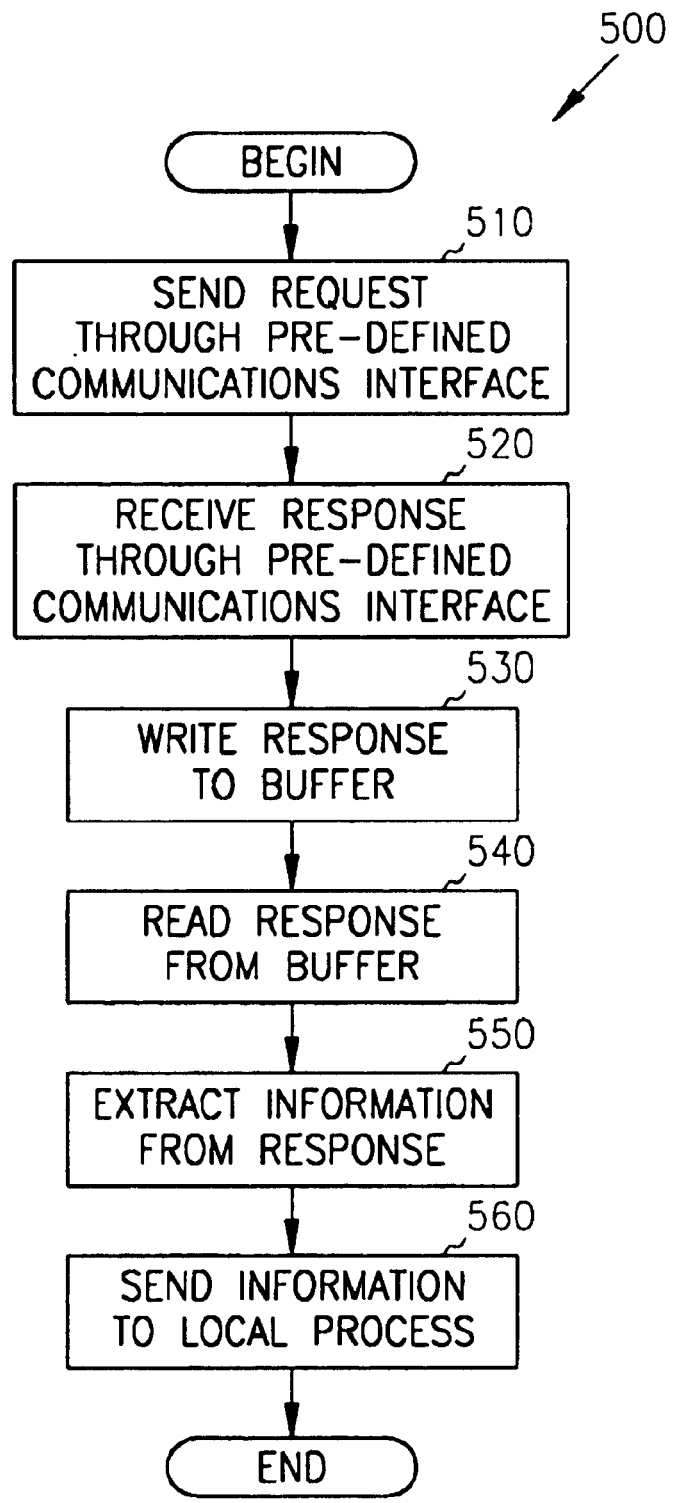
FIG. 5 is a flowchart of a method according to an embodiment of the invention.

Referring next to FIG. 5, a flowchart of a method 500 performed by a controller according to an exemplary embodiment of the invention is shown. Method 500 begins and thereafter a request or command is transmitted or sent to a system of computing units and controllers that the sender is a member of, through a pre-defined communication interface using a standardized format for the request 510. The communication interface is common and ubiquitous to the computing units and the controlling units in the system. Thereafter, a response to the command or request is received by the sender through the pre-defined communication interface 520. The response is written to a buffer 530 for purposes to accommodating differing transmission and receiving speeds. Then response is retrieved from the buffer 540, and information is retrieved from the response and the local destination of the information is determined 550. Then the information is extracted and passed along to a local task associated with the local destination through an interface that is unique to the destination 560, for receipt and use by the local destination.

In one embodiment, the pre-defined communication interface is a software component executing in the controller. In another embodiment, the controller transmits to the pre-defined communication interface information indicating an individual controller or controllers that the controller will exchange requests, responses and/or event with exclusively. The information limiting the exchange between controller acts as filter in activity between the controllers. In yet another embodiment, the controller registers with the pre-defined communication interface the types of requests and responses that the controller will be limited to in communication with a particular controller or controllers. Similarly, the controller can unregister by transmitting to the pre-defined communication interface the identity of the controllers that the controller will not longer limit exchange. In one embodiment, registration and unregistration can occur at any time while the controller is operation, and in another registration occurs only before the first exchange of requests and/or responses.

The particular methods performed by a scalable tiered computing system of an exemplary embodiment of the invention have been described. The method performed by a scalable tiered computing system has been shown by reference to a flowchart including all the acts from transmitting a request to another controller until a response has been received and passed along to a local device.

Figure 6:
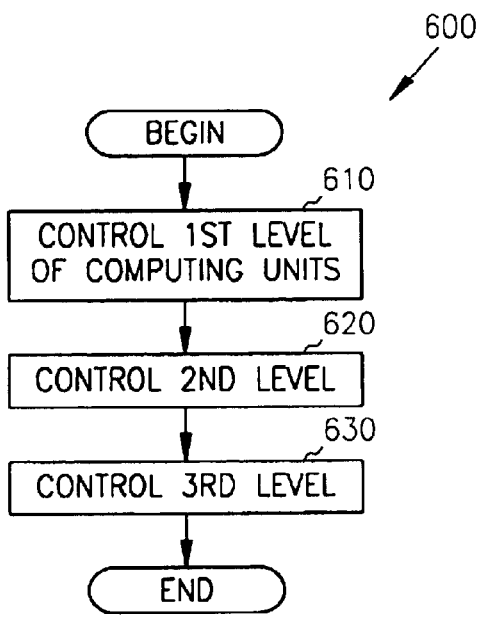
FIG. 6 is a flowchart of a method according to an embodiment of the invention.

Referring next to FIG. 6, a flowchart of a method 600 performed by a controller according to an exemplary embodiment of the invention is shown. Method 600 begins with controlling a first level of an individual computing unit 610 in which each controller is dedicated to an individual computing unit. A system implementing method 600 can have numerous computing units being controlled. In one embodiment, the controlling of the first level more specifically includes receiving a request from the second level, then transmitting to the second level a response to first level request. In yet another embodiment, the control of a first level 610 can include transmitting an event message to the second level and receiving an event message from the second level.

Method 600 also includes controlling a second level of a plurality of individual computer units 620 in which a conglomerate or aggregate of units at the first level are controlled. In one embodiment, the controlling of the second level more specifically includes receiving a request at the first level that was transmitted from the second level, then transmitting from the first level to the second level a response to second level request. In yet another embodiment, the control of a second level 620 can include transmitting an event message from the first level to the second level and receiving an event message from the first level. The second level can also interact with the third level in the same manner as the first level does: In one embodiment, the controlling of the second level more specifically includes receiving a request at the third level that was transmitted from the second level, then transmitting from the third level to the second level a response to second level request. In yet another embodiment, the control of a second level 620 can include transmitting an event message from the third level to the second level and the second level receiving an event message from the third level.

The method 630 also includes controlling a third level of a plurality of second levels in which a conglomerate or aggregate of units at the first second are controlled. In one embodiment, the controlling of the third level more specifically includes receiving a request at the first or second levels that was transmitted from the third level, then transmitting from the first level or second levels to the third level a response to third level request. In yet another embodiment, the control of a third level 630 can include transmitting an event message from the first or second levels to the third level and receiving an event message from the first level or second levels. Thereafter, the method 600 ends.

The particular methods performed by a scalable tiered computing system of an exemplary embodiment of the invention have been described. The method performed by a scalable tiered computing system has been shown by reference to a flowchart including all the acts from controlling the first level until controlling the third level.

Figure 7:
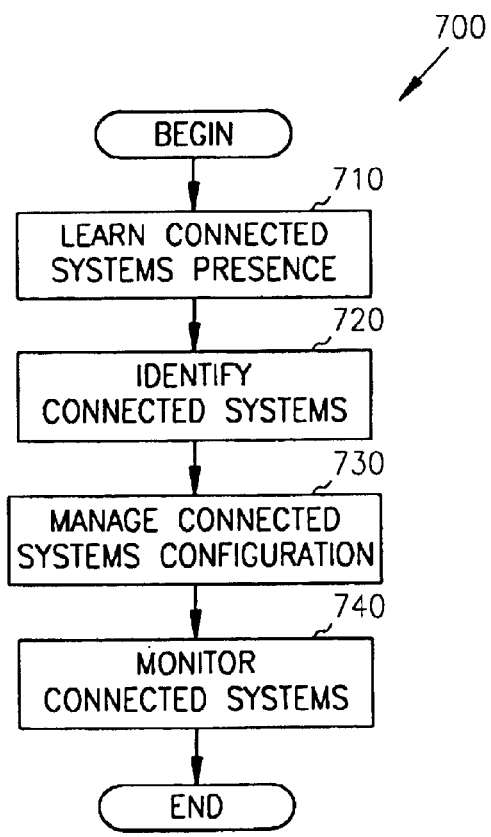
FIG. 7 is a flowchart of a method according to an embodiment of the invention.

Referring next to FIG. 7, a flowchart of a method 700 performed by a client according to an exemplary embodiment of the invention is shown. In one embodiment, the actions of method 700 are auxiliary to the actions of method 600. Method 700 begins with each controller learning presence of all of the directly connected systems 710, such as peer controllers, controllers at adjacent levels, system monitors, and individual computing units. In one embodiment, the learning 710 more specifically includes learning the presence of one or more of the following devices, slave individual computing unit, local console, modem, display, master first level controller, peer first level controller, master second level controller, master third level controller.

Thereafter, the identity of each of the connected systems is determined 720, and then the configuration of the connected systems is managed 730. In one embodiment, the management 730 includes each controller receiving information describing the configuration of the connected systems and thereafter creating a master system configuration that is stored in the controllers. In one embodiment, the master system configuration is stored in the system controllers at adjacent levels, system monitors, and individual computing units. In another embodiment, the identification 730 more specifically includes identifying one or more of the following devices, slave individual computing unit, local console, modem, display, master first level controller, peer first level controller, master second level controller, master third level controller.

Subsequently, each of the connected systems is monitored for activity or status 740, such as requests, responses, events. In one embodiment, the monitoring 740 includes monitoring the activity of individual computer units in the first level and routing the activity information to the second level controller managing the first level controller. In another embodiment, the monitoring includes monitoring any of the following: power state, temperature, cooling fan status, voltage regulator module state, heartbeat state, password state, activity-log state, debug-level state, non-volatile random access memory state, identification-number, partition state, display state, LED display state, firmware version and flash memory state.

Later appropriate action is taken by the apparatus implementing method 700, such as passing along a part of, or the entire, request, response, or event to another controller, or local device. Thereafter, the method 700 ends.

The particular methods performed by a scalable tiered computing system of an exemplary embodiment of the invention have been described. The method performed by a scalable tiered computing system has been shown by reference to a flowchart including all the acts from initially detecting a connected system through the action of monitoring the system.

Figure 12:
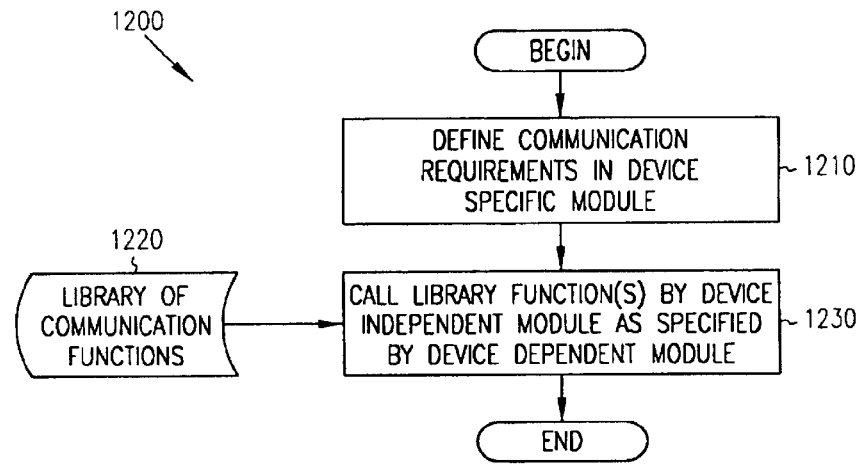
FIG. 12 is a flowchart of an embodiment of communication control by the invention.

Referring next to FIG. 12, a flowchart of a method 1200 performed by a controller according to an exemplary embodiment of the invention is shown. Method 1200 begins with a definition 1210 of communication requirements in a device specific module. As described below, there is a device specific module for each device connected to a computing unit under control of the controller performing operations according to the illustrated method.

A library of functions 1220 is provided for access by a device independent module. When it is necessary to communicate with a device, the device dependent module associated therewith sends a message to the device independent module identifying the function(s) that need to be called to communicate with the device and arguments required by the function(s). The device independent module then calls 1230 the library function(s) with the arguments supplied by the device dependent module. Any device specific code that is not included in the function library is included in the device dependent module and executed as necessary to communicate with the device associated with the device dependent module.

Figure 13:
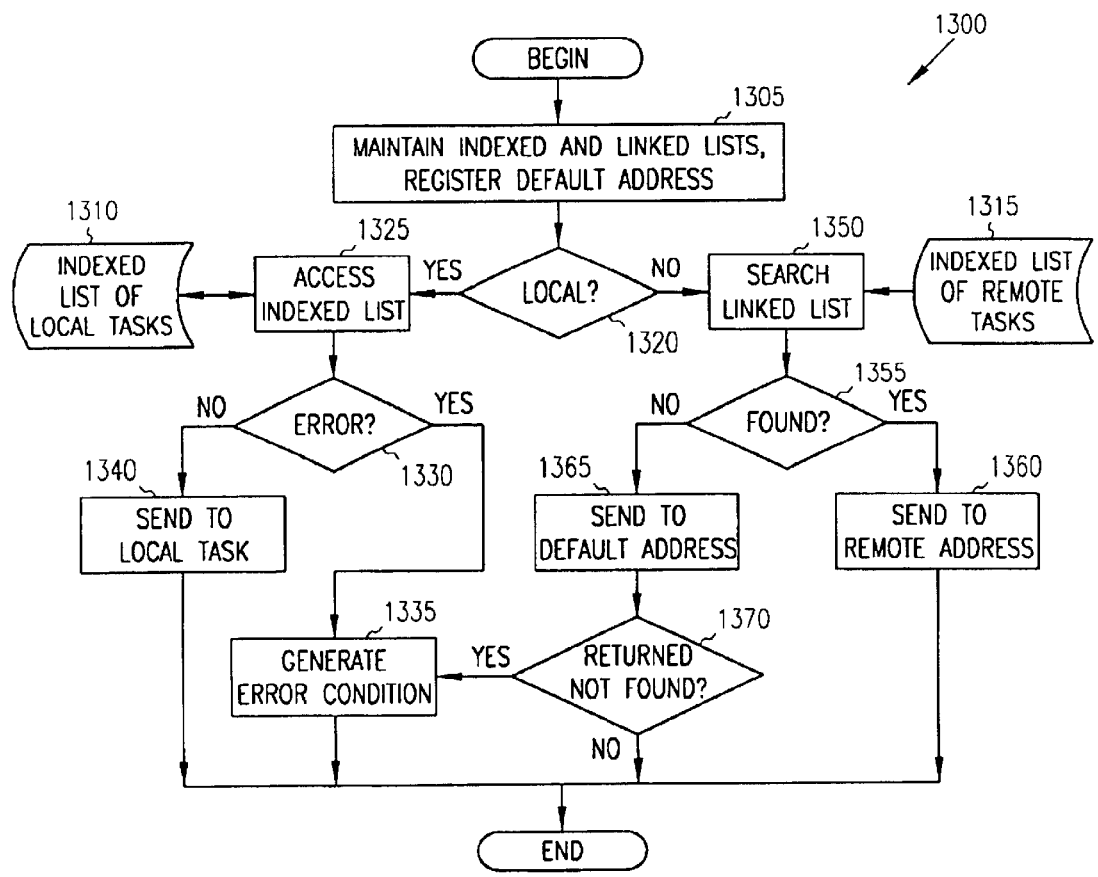
FIG. 13 is a flowchart of addressing operations in the embodiment of communication control illustrated in FIG. 12.

The preferred embodiments use an addressing method 1300 illustrated in FIG. 13 that is designed to be highly efficient for execution by an embedded system, like the controller described above. The addresses preferably identify a target and a task executing on that target. The target is preferably identified by an L1 unit's location, e.g., rack identifier and brick identifier. If the task is executing at a level higher than L1, a modifier is used to indicate the offset from the L1 identified by rack and brick identifiers. For example, an L2 unit may be identified using any of the L1 units that it controls with a modifier indicating that the task is executing in the L2 unit controlling that L1 unit.

The method illustrated in FIG. 13 begins with maintaining 1305 an indexed list 1310 of the local tasks communicating with the device independent module and a linked list 1315 of remote devices communicated with using the device dependent modules. In addition, a default address is registered. Typically, the default address is the address of the next higher level controller, or the master controller in a "peer" configuration of same level controllers.

Communications are routed by comparing 1320 the target portion of the destination address with the controller's own address (or alias) to determine whether the target is a local task or a remote device. Most messages are likely to be processed locally and an indexed list 1310 is the fastest way to route such messages. If the address of a message or event matches the controller's own address, the task portion of the message's destination address is used as an index to access 1325 the indexed list 1320. If it is determined 1330 that no task registered in that "slot" in the indexed list 1310, then an error response 1335 is generated indicating to the original sender that no receiver was available for the message. Otherwise, the communication is sent 1340 to the local task.

If the target portion of the destination address does not match the controller's own address, the linked list 1315 is searched 1350 for an entry with a target that matches the message's destination target. Preferably, only addresses used often are kept in the linked list 1315. For example, only devices directly connected to the computational unit controlled by the controller performing the method illustrated in FIG. 13 could be included in the linked list 1315. If the target is found 1355, the communication is sent 1360 to the remote device; otherwise, the message or event is sent 1365 to the default address for routing to their ultimate destination. If there is no default address registered 1370, an error response 1335 is generated. To avoid a message being bounced back and forth from the computational unit controlled by the controller performing the method illustrated in FIG. 13 and the unit at the default address, an error condition is preferably detected 1370 if a message returned from the default address is not found in the indexed list 1310 or linked list 1315.

Additional Scalable Tiered Computing System Implementations

In this section of the detailed description, additional example implementations of the system of the present invention are described.

Figure 14:
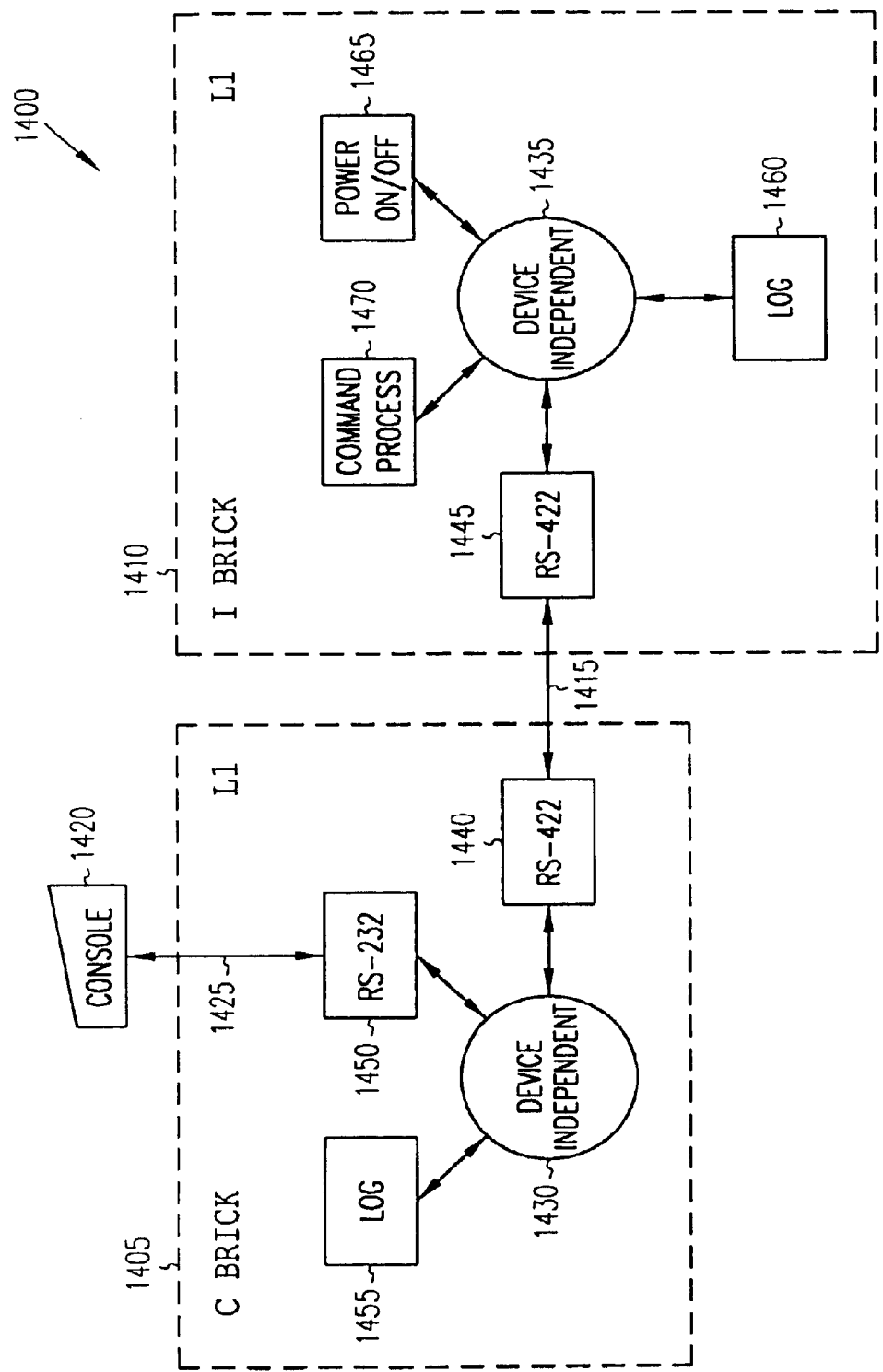
FIG. 14 is a block diagram of a C brick and an I brick of the invention.

First, an example of how communication is performed will be described with reference to FIG. 14. One of the simplest configurations possible of a system 1400 that utilizes the present invention is a C brick connected to an I brick. The controllers of L1 units, e.g., 235, 240, 245, 250, 255, 260, 270 in FIG. 2, may be very simple devices, such as single chips containing a microprocessor and a UART, such as a Motorola ColdFire, model MCF5206e, together with a small amount of memory, e.g., 64K or 128K and peripheral circuits, such as additional UARTs, flash memory chips, (e.g., AMD 28LV800), non-volatile RAM chips (e.g., Dallas Semiconductor DS 1742W), USB device controller (e.g., Lucent US 8258), etc.

C brick controller 1405 is connected to I brick controller 1410 via an RS-422 connection 1415 and the C brick controller 1405 is also connected to a console 1420 via an RS-232 connection 1425. Some of the tasks executing in the C and I brick controllers 1405, 1410 are illustrated in FIG. 14. These tasks include device independent modules 1430, 1435, RS-422 device specific tasks 1440, 1445 for communicating over the RS-422 connection 1415 and RS-232 device specific task 1450 for communicating over the RS-232 connection 1425. Other device specific tasks not illustrated in FIG. 14 might be included to communicate with devices over other types of interfaces, such as universal serial bus (USB) for communication with a higher level controller (L2), interchassis management bus (ICMB) for communication between L2 controllers and D bricks that contain disk drives, Ethernet for communication between higher level controllers L2 and L3, etc.

Other tasks executing in the level one controllers are not associated with communication with another device and are therefore local tasks. Each of the controllers 1405, 1410 illustrated in FIG. 14 include a log task 1455, 1460 and a power on/off task 1465 and command process 1470 are also included in the I brick controller 1410. The RS-232 task 1450 is also considered a local task, because the console 1420 is not an intelligent device (although its operator may possess intelligence).

When the C and I brick controllers 1405, 1410 are initialized, the tasks required by the bricks begin execution and register with the device independent modules 1430, 1435 in the controllers of each brick. The log tasks 1455, 1460 register to receive error conditions and other messages that are to be stored in memory. Power on/off task 1465 registers with device independent module 1435 to turn the I brick controlled by controller 1410 on and off. For example, the I brick may be turned off when not in use to conserve energy. Command process 1470 registers with device independent module 1435 to control operation of I brick 1435. The RS-232 task 1450 registers with device independent module 1430 to communicate with the console 1420. The RS-422 tasks 1440, 1445 register with device independent modules 1435, 1440, respectively, to provide communications between the C brick controller 1405 and I brick controller 1410.

The log tasks 1455, 1460, power on/off task 1465, command process 1470 and RS-232 task 1450 are all registered in the indexed list 1320 (FIG. 12) as local tasks, because they do not communicate with tasks or processes executing on another device. The RS-422 tasks 1440, 1445 are registered in the linked list 1330 as handling messages to remote devices. RS-232 task 1450 registers with device independent module 1430 to receive messages for the console 1420. RS-422 task 1440 registers with device independent module 1430 to receive messages for I brick controller 1410, and conversely RS-422 task 1445 registers with device independent module 1435 to receive messages for C brick controller 1405. However, a task that interfaces with a modem (not shown) could be indexed with the local tasks if it uses a protocol for a dumb terminal, such as a VT101 protocol, or could be registered in the linked list 1330 if it uses a protocol like TCP/IP to communicate with an intelligent device.

When a user at the console 1420 begins a process that requires data accessible by the I brick controller 1410, a message sent from the console 1420 via RS-232 connection 1425 is received by RS-232 task 1450 in a manner described in more detail below. The RS-232 task routes the message to another process executing on the I brick, such as a power on/off control process 1465. Subsequently a message address to the I brick controller 1410 will be generated.

The RS-422 task 1440 in C brick controller 1405 is registered with the device independent module 1430 to receive all messages addressed to the I brick controller 1410. Therefore, the device independent module 1430 will inform the RS-422 task 1440 that there is a message to be sent. Information regarding the type of message may also be provided. RS-422 task 1440 responds by identifying a library function included in the function library of device independent module 1430 that can be used to transfer messages over the RS-422 connection 1415. Any arguments required by the function are also supplied. The function is executed to begin the process of sending information over the RS-422 connection 1415.

Figure 15:
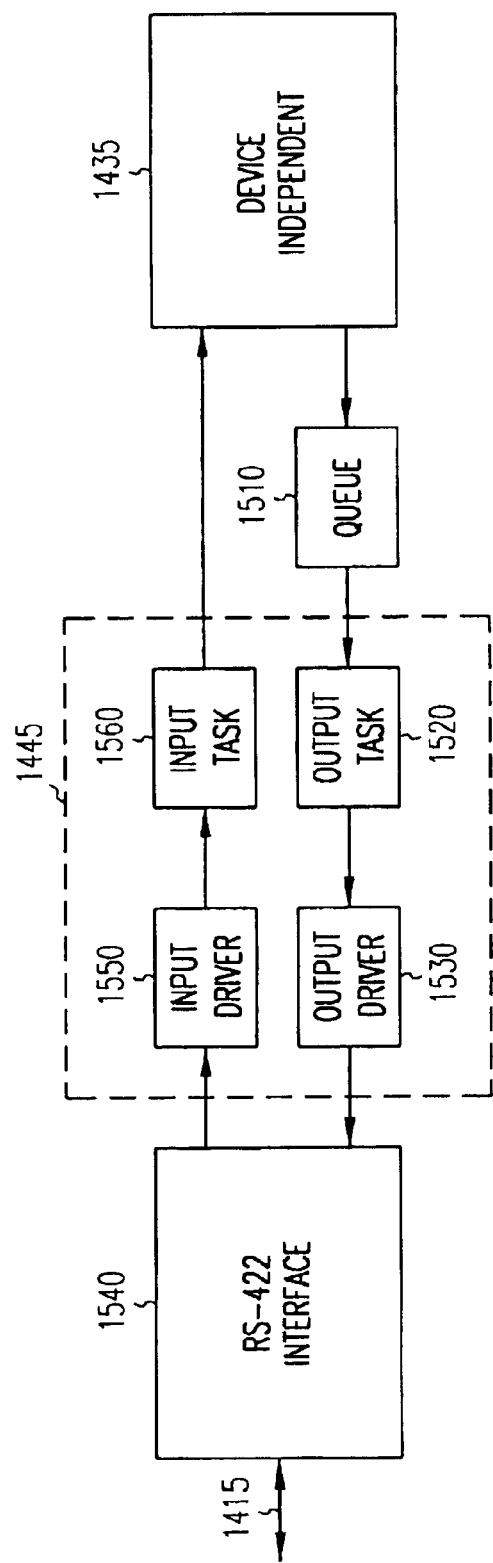
FIG. 15 is a block diagram of device dependent and independent modules of the invention.

As an example of how the device dependent and independent modules perform communication according to the present invention, details of communication over RS-422 connection 1415 will be described with reference to FIG. 15. Device independent module 1435 in I brick controller 1410 determines that a message needs to be sent to C brick controller 1405 when the target of an address different from the controller's own address is found in linked list 1330 as registered to RS-422 task 1445. Device independent module 1435 then places a message on queue 1510. When RS-422 task 1445 is ready to remove the message from queue 1510, output task 1520 calls a function in device independent module 1435 and supplies a pointer to output driver 1530 with a list of arguments required by output driver 1530 and a pointer to the message in queue 1510. Device independent module 1435 encodes the message according to the function specified by output task 1520 and calls output driver 1530 as many times as necessary to transmit the message from queue to RS-422 interface 1540.

For incoming data, input task 1560 calls a function in device independent module 1435 supplying a pointer to input driver 1550 and a list of arguments and a pointer to the message being received. Device independent module 1435 calls input driver 1550 as many times as necessary to receive the entire contents of an encoded message and then decodes the message and supplies the location of the received message to input task 1560. The message is sent to its destination with the controller by input task 1560 identifying the function in device independent module 1435 to be executed.

Figure 8:
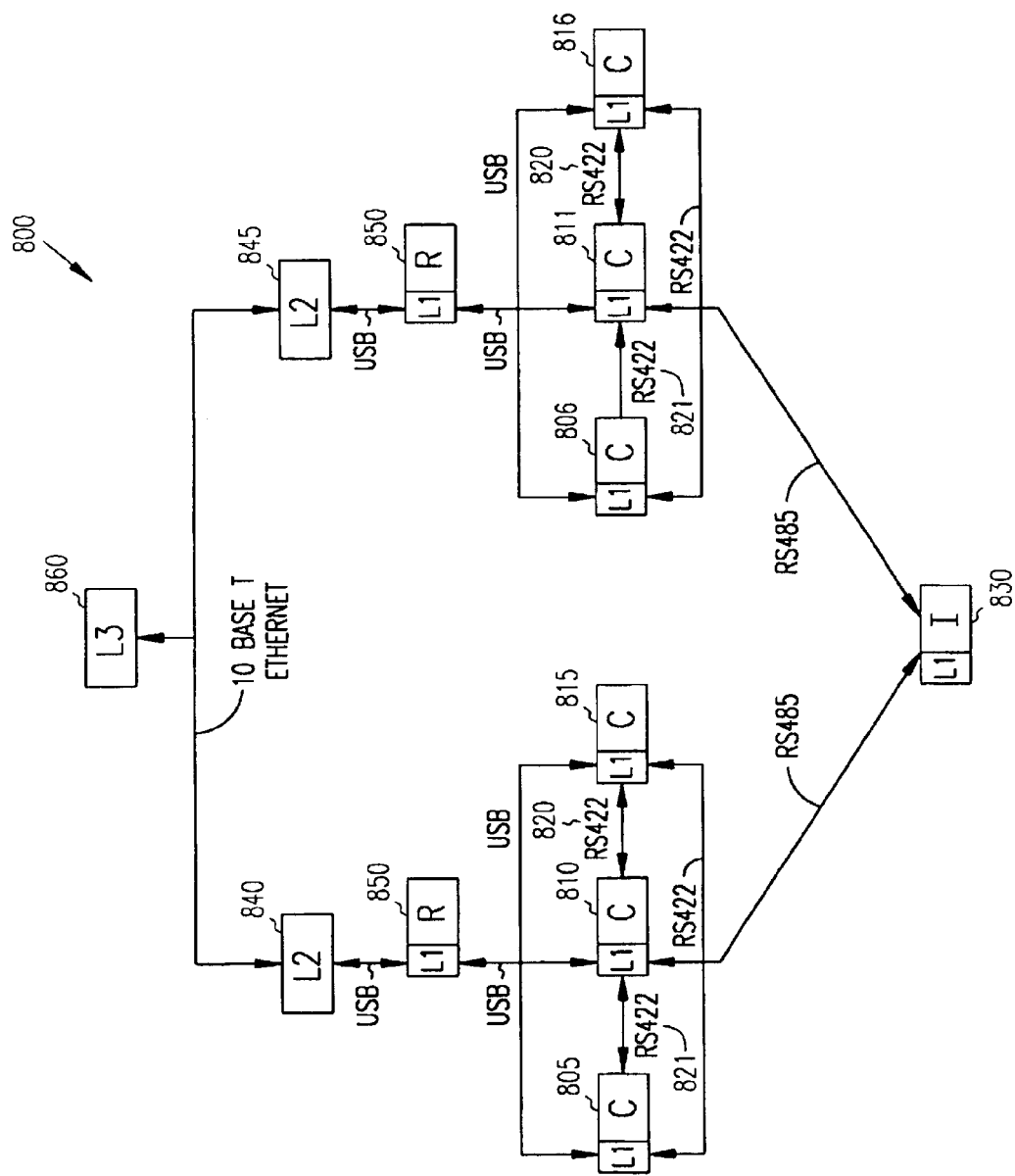
FIG. 8 is a block diagram of a large-scale three-tiered embodiment apparatus of the invention.

FIG. 8 is a block diagram of a large-scale three-tiered embodiment of the invention. The system 800 includes any number of C brick computing units such as 805, 806, 810, 811, 815 and 816, in which each of the C bricks has a L1 controller which implements the methods described above. The C bricks 805, 806, 810, 811, 815 and 816 are grouped into one or more aggregations or groups such as group 1 (not labeled) that is composed of C bricks 805, 810 and 815 and group 2 (not labeled) that is composed of C bricks 806, 811 and 816. In one embodiment of a grouping, the bricks are grouped into physical racks that the bricks reside in. In one embodiment, the C bricks within a group communicate through their respective L1 controllers. In a more specific embodiment, the C bricks in a group communicate between their L1 controllers through a RS-422 connection 820 and 821. In another embodiment, the C bricks communicate with any number of X bricks, P bricks and/or I bricks 830. In a more specific embodiment, the C bricks communicate with X, P and I bricks through a RS-485 connection, which may be used as an RS-232 interface. Each of the L1 controllers can send requests and event messages to and receive responses and event messages from the other L1 controllers.

The L1 controller also includes a task manager for each the local devices and controllers connected to the L1 controller. The L1 task manager links the predefined communication interface to the local device or controller.

Each group or aggregation of C, P, I and X bricks are operably controlled by a level two (L2) controller 840 and 845. In one embodiment, the L1 and L2 controllers communicate through a USB. In another embodiment, a R brick having an L1 controller 850 is connected between the L2 controller 845 and the group of C, P, I, and X bricks to manage the communication traffic of requests, responses and event messages between the L2 controller 845 and the group of C, P, I, and X bricks. In a more specific embodiment, the L1 controller in the R brick includes firmware that provides a peer-level interaction with the C bricks. In another embodiment, one of the L2 controllers can be designated as the master L2 controller, such as 845.

Similar to the L1 controller, any one of the L2 controllers can be connected to, and communicate with a local device, such as, a system management (console) unit that enables a user to enter a user command and receive a response and status information. The L2 controller also includes a task manager for each the local devices and controllers connected to the L2 controller. L2 The task manager links the predefined communication interface to the interface associated with the device or controller.

Finally, a level three (L3) controller 860 is operably connected to, and communicates with, any number of L2 controllers, such as 840 and 845. In one embodiment, communication is implemented through an Ethernet connection.

Similar to the L1 controller and the L2 controller, any one of the L3 controllers can be connected to, and communicate with a local device, such as, a system management (console) unit that enables a user to enter a user command and receive a response and status information, or an I2C low unit, and an I2C high unit.

The L3 controller also includes a task manager for each the local devices and controllers connected to the L3 controller. The L3 task manager links the predefined communication interface to the interface associated with the device or controller.

Each of the controllers in system 800 communicate through a pre-defined communication interface that uses a standardized format common to each of the controllers. Each controller is able to transmit a request or a command to any one of the other controllers, the receiving controller is capable of transmitting a response to the command or request, and any one of the controllers can broadcast a message of an event to any number of controllers in the system 800. The purpose of a request is to prompt another controller to perform an action or return information. The purpose of a response is to respond to a request. The purpose of an event message is to indicate the occurrence of an event such as a state change or an error condition.

More specifically, the standardized format of the request command that is transported through the common communication interfaces of the controllers includes an operation field, a sequence identifier field, an authority level field, a destination address, a return address, a data command payload field, and a field indicating the length of the field storing data representing command information. The standardized format of the request response that is transported through the common communication interfaces of the controllers includes an operation field, a sequence identifier field, a destination address, a response data field, and a field indicating the length of the response data. The standardized format of the event message that is transported through the common communication interfaces of the controllers includes an operation field, a source controller address, an event data field, and a field indicating the length of the event data. In one embodiment, the destination address, return address and source address are a 24-bit word composed of a 19-bit target identifier and a 5-bit target task, in which the target identifier is composed of a 6 bit brick identifier, a 10 bit rack identifier, and a 3-bit modifier.

The use of the standardized formats for communication between bricks and controllers enables system designers to scale the system to the required size without changing the system software control code. More specifically, the system designers can add, delete and replace bricks according to the application requirements with no changes to the system control software. Moreover, a system can be reconfigured with variations in the combinations of bricks and controllers after the system has been original designed and/or installed and operating in response to changes in the application needs.

FIG. 8 thus describes a large-scale three-tiered hierarchical controlled system of computing unit bricks which includes dedicated first level controllers for each of the bricks, level two controllers and a level three controller.

Figure 9:
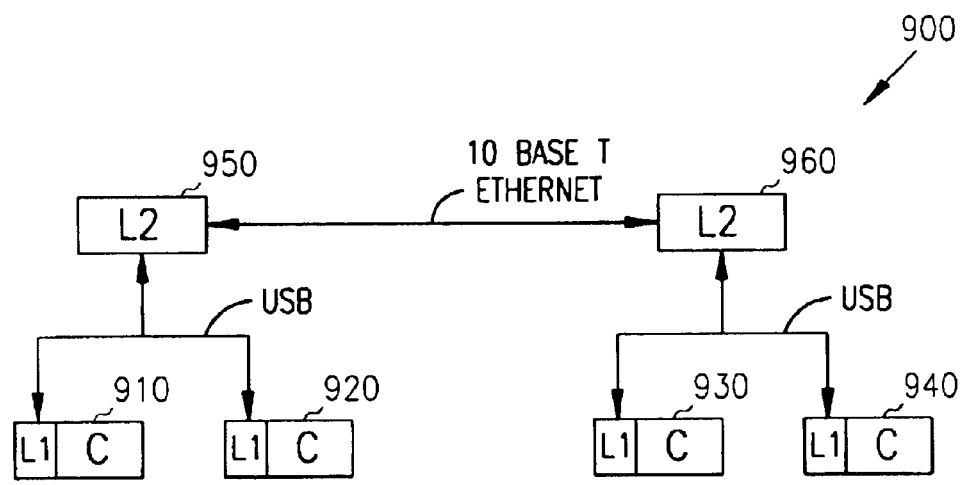
FIG. 9 is a block diagram of a medium-scale two-tiered embodiment apparatus of the invention.

FIG. 9 is a block diagram of a medium-scale two-tiered embodiment apparatus of the invention. System 900 features two L2 controllers, 950 and 960, in communication as peers with no single master controller as in the L3 controller 860 in FIG. 8. System 900 includes any number of bricks, such as C bricks 910, 920, 930 and 940 at the lowest level of the hierarchy, each locally controlled by L1 controllers, similar to FIG. 8. As in FIG. 8, each of the L1 controllers communicate with it's master L2 controller via a USB connection using a standardized communication interface. The L1 controllers include task managers to communicate between the local devices and local bricks, and the L2 controller.

Optionally, one of the L2 controllers, 950 and 960 may be designated as the master L2 controller. Either of the C brick L1 controllers may be optionally designated as the master L1 controller between the two C bricks, 1010 and 1020.

FIG. 9 describes a two-level scaled system in which the first level of computing unit bricks is no different than in FIG. 8, and in which the level two controllers are the highest level of control and communicate as peers, or with one of the level two controllers operating as the master of the system.

Figure 10:
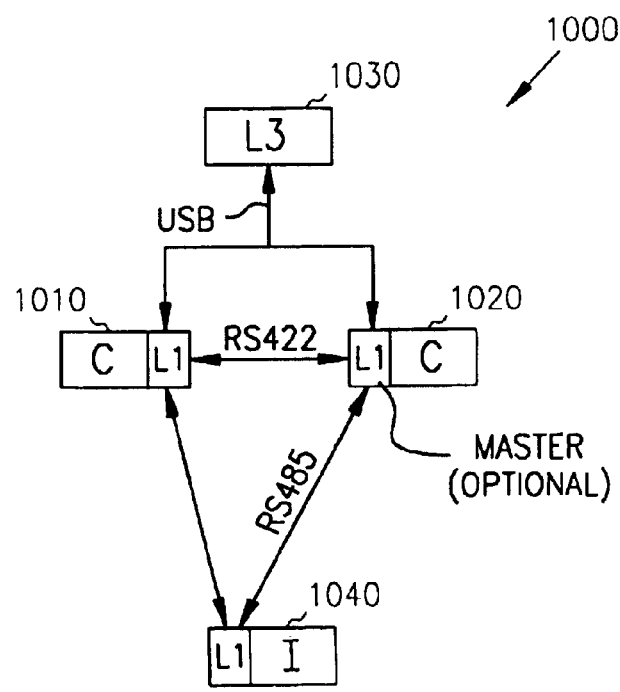
FIG. 10 is a block diagram of a small-scale two-tiered embodiment apparatus of the invention.

FIG. 10 is a block diagram of a small-scale two-tiered embodiment apparatus of the invention. The small-scale system 1000 includes at most, two C bricks 1010 and 1020, no L2 controllers, and an L3 controller 1030 configured with L2 controller emulation software.

Similar to the systems described in FIGS. 8 and 9, the lowest of the hierarchy may includes any number of R, X, P, and I bricks, such a I brick 1040 connected to the C bricks 1010 and 1020 through a RS-422 line, and in which bricks are all locally controlled by L1 controllers, and each of the C brick L1 controllers communicate with it's master controller 1030 via a USB connection using a standardized communication interface. The L1 controllers include task managers to communicate between the local devices and local bricks, and the master controller 1030.

The L3 controller 1030 includes L2 controller emulation software to support communication through the USB interface communication line, which is not a function otherwise supported in the L3 controller.

FIG. 10 describes a small-scale system that is limited to 2 C bricks, and in which a level three controller emulating a level two controller is the master to the two C bricks through a USB line.

Figure 11:
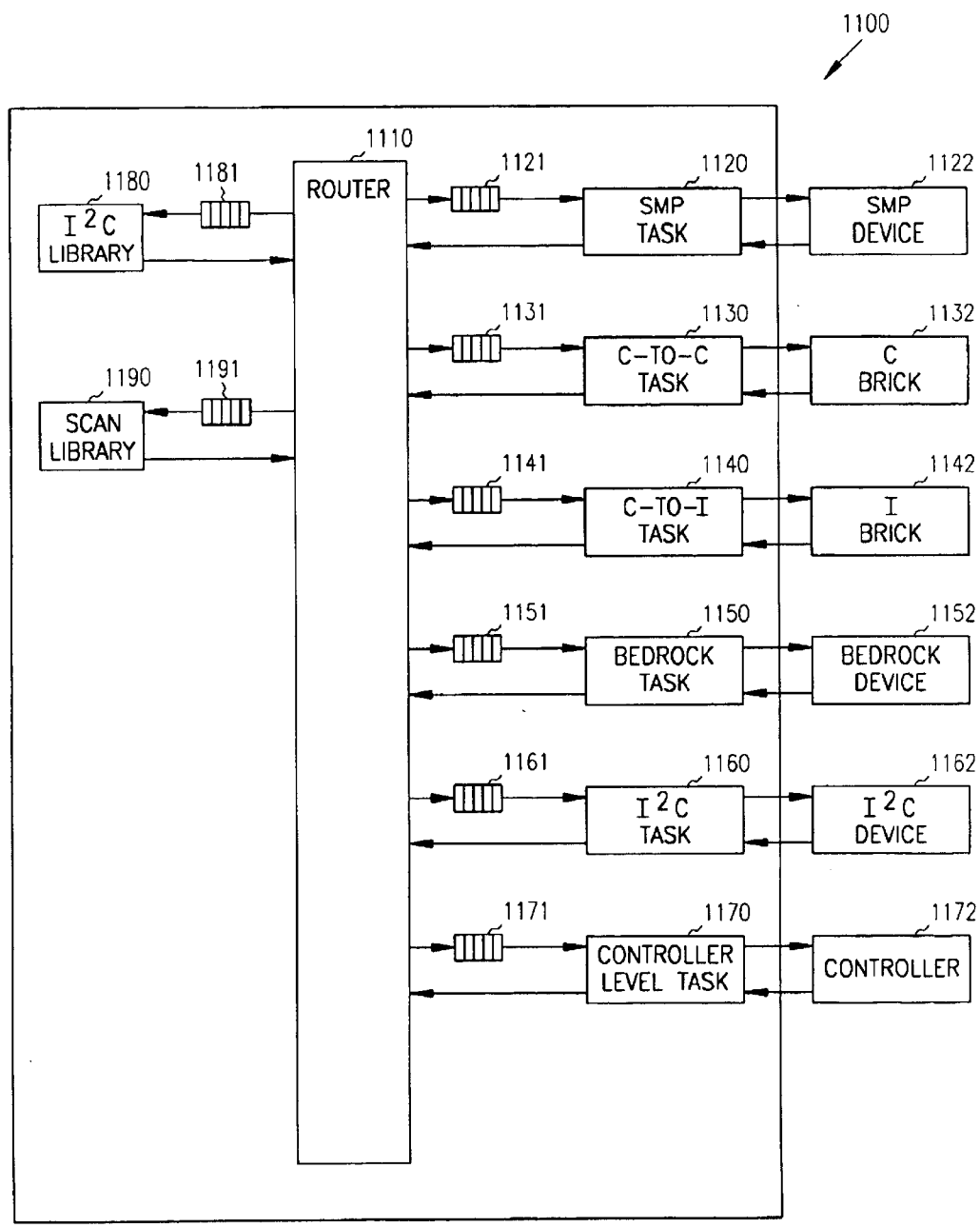
FIG. 11 is a data flow diagram of an embodiment of a controller of the invention.

FIG. 11 is a data flow diagram of an embodiment of a controller of the invention. More specifically, FIG. 11 describes the interaction between the router of a controller and external devices.

The controller 1100 includes a pre-defined communication interface 1110 that will exchange packets such as requests, response and messages internally within the controller. In one embodiment, the interface 1110 routes the packets primarily between controller(s) connected at adjacent levels within the hierarchy of controllers and the local sensors and devices communicating with the controller. For example, the router 1110 will manage the traffic of packets for a level one (L1) controller between the connected level two (L2) controller and the local sensors and other devices such as local I, X and R bricks.

More specifically, the system management port SMP task 1120 associated with a local console manages communication between a SMP console device 1122 and the controller 1100. The SMP task 1120 will receive request, response and event packets from packet router 1110. In one embodiment, the packets are temporarily buffered in queues 1121 and 1123 between the router 1110 and the SMP task. The SMP task 1120 unencapsulates the SMP data from the packet and transmits the SMP data to the SMP device 1122. The SMP task 1120 also receives transmissions from the SMP device 1122, encapsulates the data in a packet, and transmits the packet to the router 1110.

The C-TO-C task 1130 associated with a locally connected C brick manages communication between a C brick 1132 and the controller 1100. The C-TO-C task 1130 will receive request, response and event packets from packet router 1110. In one embodiment, the packets are temporarily buffered in queues 1131 and 1133 between the router 1110 and the C-TO-C task. The C-TO-C task 1130 unencapsulates the C-TO-C data from the packet and transmits the C-TO-C data to the C brick 1132. The C-TO-C task 1130 also receives transmissions from the C brick 1132, encapsulates the data in a packet, and transmits the packet to the router 1110.

The C-TO-I task 1140 associated with a locally connected I brick manages communication between an I brick 1142 and the controller 1100. The C-TO-I task 1140 will receive request, response and event packets from packet router 1110. In one embodiment, the packets are temporarily buffered in queues 1141 and 1143 between the router 1110 and the C-TO-I task. The C-TO-I task 1140 unencapsulates the C-TO-I data from the packet and transmits the C-TO-I data to the I brick 1142. The C-TO-I task 1140 also receives transmissions from the I brick 1142, encapsulates the data in a packet, and transmits the packet to the router 1110.

In other embodiments, controller 1100 uses tasks adapted for R, X or P bricks to manage communications between the router 1110 of the controller 1100 and the R, X, or P brick.

The system management port bedrock computing unit task 1150 manages communication between a bedrock computing unit console device 1151 and the controller 1100. The bedrock computing unit task 1150 will receive request, response and event packets from packet router 1110. In one embodiment, the packets are temporarily buffered in queues 1151 and 1153 between the router 1110 and the bedrock computing unit task. The bedrock computing unit task 1150 unencapsulates the bedrock computing unit data from the packet and transmits the bedrock computing unit data to the bedrock computing unit device 1152. The bedrock computing unit task 1150 also receives transmissions from the bedrock computing unit device 1152, encapsulates the data in a packet, and transmits the packet to the router 1110.

The system management port I2C task 1160 manages communication between a I2C device 1161 and the controller 1100. The I2C task 1160 will receive request, response and event packets from packet router 1110. In one embodiment, the packets are temporarily buffered in queues 1161 and 1163 between the router 1110 and the I2C task. The I2C task 1160 unencapsulates the I2C data from the packet and transmits the I2C data to the I2C device 1162. The I2C task 1160 also receives transmissions from the I2C device 1162, encapsulates the data in a packet, and transmits the packet to the router 1110.

A controller level task 1170 associated with a controller at an adjacent level manages communication between the controller at an adjacent level 1161 and the controller 1100. The controller level task 1170 is adapted for the communication protocol of the communication line with the outside controller, such as USB or Ethernet, and will receive request, response and event packets from packet router 1110. In one embodiment, the packets are temporarily buffered in queues 1171 and 1173 between the router 1110 and the controller level task. The controller level task 1170 transmits the packet to the controller at an adjacent level 1172. The controller level task 1170 also receives packets from the controller at an adjacent level 1172 and transmits the packet to the router 1110.

System 1100 also includes libraries, connected to the router, that serve the same function as tasks, but differ from tasks in that the libraries purpose is to local requests received from the router 1110. Libraries include an $I^2C$ library 1180, and a scan library 1190.

The difference between the tasks and the libraries in system 1100 is that the tasks are embodied as processes or threads, each with their own priority and stack, which the task received a packet that is passed by value. In contrast, libraries receive a pointer to a packet that is operating in a thread or process of the router 1100.

The system management port $I^2C$ library 1180 manages local communication between a $I^2C$ device 1181 and the controller 1100. The $I^2C$ library 1180 will receive request, response and event packets from packet router 1110. In one embodiment, the packets are temporarily buffered in queue 1181 between the router 1110 and the $I^2C$ library. The $I^2C$ library 1180 unencapsulates the $I^2C$ data from the packet and transmits the $I^2C$ data to the $I^2C$ device (not shown). The $I^2C$ library 1180 also receives transmissions from the $I^2C$ device, encapsulates the data in a packet, and transmits the packet to the router 1110.

The system management port scan library 1190 manages local communication between a scanned device 1191 and the controller 1100. The scan library 1 190 will receive request, response and event packets from packet router 1110. In one embodiment, the packets are temporarily buffered in queue 1191 between the router 1110 and the scan library. The scan library 1190 unencapsulates the scanned data from the packet and transmits the scanned data to the scan device (not shown). The scan library 1190 also receives transmissions from the scanned device, encapsulates the data in a packet, and transmits the packet to the router 1110.

Conclusion

A control system of a tiered scalable parallel computing system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and attributes are not intended to limit the invention. Furthermore, additional methods and attributes can be added to the objects, and functions can be rearranged among the objects, and new objects to correspond to future enhancements and physical devices used in the invention can be introduced without departing from the scope of the invention. One of skill in the art will readily recognize that the invention can be applicable to future communication devices, different file systems, and new data types.

The terminology used in this application with respect to is meant to include all communication environments and alternate technologies which provide the same functionality as described herein. Therefore, it is manifestly intended that this invention be limited only by the following claims and equivalents thereof.

What is claimed is:

1. In a computing system having a plurality of interconnected computer units, wherein each computer unit includes a processor and a level one controller, a method of controlling individual computing units, the method comprising:

connecting operably each level one controllers to a level two controller;

connecting operably each level two controllers to a level three controller;

sending a request from one of the controllers to a controller at a different level;

receiving a response at the one of the controllers from the controller at a different level;

sending an event message from one of the controllers to a controller at a different level;

receiving the event message at the controller at a different level yielding a received event message;

performing a pre-determined action by the controller at a different level in response to the received event message; and sending a request from one of the controllers to a controller at the same level.

2. The method of controlling individual computing units as in claim 1, wherein sending an event message comprises sending an event message to a higher level controller.

3. The method of controlling individual computing units as in claim 1, wherein sending an event message comprises sending an event message to a controller at the same level.

4. The method of controlling individual computing units as in claim 1, wherein:

sending a request comprises transmitting a request through a pre-defined communication interface, wherein the request is in a standardized format common to all controllers;

receiving a response comprises receiving a response through a pre-defined communication interface, wherein the response is in a standardized format common to all controllers.

5. The method of controlling individual computing units as in claim 4, further comprising transmitting to the pre-defined communication interface information indicating at least one controller that the controller associated with the pre-defined communication interface will exchange information with exclusively.

6. The method of controlling individual computing units as in claim 1, wherein sending a request from one of the controllers to a controller at a different level further comprises sending a request from a level one controller to a controller at a different level; and wherein receiving a response at the one of the controllers from the controller at a different level further comprises receiving a response at a level one controller from the controller at a different level.

7. The method of controlling individual computing units as in claim 6, wherein sending a request from a level one controller to a controller at a different level is performed in response to receiving transmission from a device selected from the group consisting of an input/out computing unit, a processor computing unit, a system management computing unit, a routing computing unit, a bedrock computing unit, a level two controller, and a level three controller.

8. The method of controlling individual computing units as in claim 1, wherein sending a request from one of the controllers to a controller at a different level further comprises sending a request from a level two controller to a controller at a different level and wherein receiving a response at the one of the controllers from the controller at a different level further comprises receiving a response at a level two controller from the controller at a different level.

9. The method of controlling individual computing units as in claim 8, wherein sending a request from a level two controller to a controller at a different level is performed in response to receiving transmission from a device selected from the group consisting of a system management computing unit, a level one controller, a level two controller, and a level three controller.

10. The method of controlling individual computing units as in claim 8, wherein sending a request from a level three controller to a controller at a different level is performed in response to receiving a transmission from a device selected from the group consisting of a system management computing unit, a level one controller, and a level two controller.

11. The method of controlling individual computing units as in claim 1, wherein sending a request from one of the controllers to a controller at a different level further comprises sending a request from a level three controller to a controller at a different level; and wherein receiving a response at the one of the controllers from the controller at a different level further comprises receiving a response at a level three controller from the controller at a different level.

12. A method of controlling a plurality of individual computing units, including a first and a second computing unit, wherein each computing unit includes a processor and a level one controller, the method comprising:

connecting operably each of the level one controllers to a level three controller;

learning presence of each computing unit through the operably connected level one controllers;

identifying each of the computing units;

sending a request from the level one controller of the first computing unit to the level one controller of the second computing unit;

sending a request from the level one controller of the first computing unit to a controller at a different level; and receiving a response at the controller of the first computing unit from the controller at a different level.

13. The method of controlling a plurality of individual computing units according to claim 12, wherein the method further comprises:

managing a configuration of the computing units through the operably connected level one controllers; and monitoring each computing unit through the operably connected level one controllers.

14. A method of controlling individual computing units within a system having a plurality of computer units wherein each computer unit includes a processor the method comprising:

controlling a first level of an individual computing unit;

controlling a second level of a plurality of individual computer units; and controlling a third level of a plurality of first levels;

wherein controlling the first level comprises:

receiving a first request from the second level;

transmitting a first request response to the second level; and transmitting a first event message to the second level;

wherein controlling the second level comprises:

transmitting the first request to the first level;
receiving the first request response from first level;
receiving the first event message from first level;
receiving a second request from the third level;
transmitting a second request response to the third level; and
transmitting a second event message to the third level;
wherein controlling the third level comprises:
transmitting the second request to the second level;
receiving the second request response from the second level;
receiving the second event message from the second level;
learning presence of each of a plurality of operably connected systems;
identifying each of the operably connected systems;
managing a configuration of the plurality of operably connected systems; and
monitoring each of the operably connected systems.

15. A method of controlling individual computing units within a system as in claim 14, wherein the monitoring each of the operably connected systems further comprises monitoring the physical environment of each of the operably connected systems and further comprises:
monitoring a power state of the individual computing unit;
monitoring a temperature of the individual computing unit;
monitoring a cooling fan status of the individual computing unit;
monitoring a voltage regulator module state of the individual computing unit;
monitoring a heartbeat state of the individual computing unit;
monitoring a password state of the individual computing unit;
an activity-log state of the individual computing unit;
monitoring a debug-level state of the individual computing unit;
monitoring a non-volatile random access memory state of the individual computing unit;
an identification-number state of the individual computing unit;
monitoring a partition state of the individual computing unit;
monitoring a display state of the individual computing unit;
monitoring a LED display state of the individual computing unit;
monitoring a firmware version state of the individual computing unit; and
monitoring a flash memory state of the individual computing unit.

16. The method of controlling individual computing units within a system as in claim 14, wherein the managing a configuration of the plurality of operably connected systems comprises:
receiving information describing a configuration of operably connected systems; and creating a master system configuration of individual computer units in the first level of aggregated individual computer units.

17. The method of controlling individual computing units within a system as in claim 14, wherein the monitoring each of the operably connected systems further comprises:
monitoring activity of individual computer units in the first level of aggregated individual computer units; and
routing information associated with the activity of individual computer units to one of the plurality of second level of aggregated first levels of aggregated individual computer units associated with the activity.

18. The method of controlling individual computing units within a system as in claim 14, wherein learning presence of operably connected devices further comprises:
learning presence of slave individual computing units;
learning presence of local console, modem or display;
learning presence of a master first level of aggregated individual computer unit;
learning presence of peer first level of aggregated individual computer units; and
learning presence of a master second level of aggregated first levels of aggregated individual computer units.

19. The method of controlling individual computing units within a system as in claim 14, wherein identifying each of the operably connected devices further comprises:
identifying slave individual computing units;
identifying a peer first level of aggregated individual computer units; and
identifying master second level of aggregated first levels of aggregated individual computer units; and
identifying a primary master second level of aggregated first levels of aggregated individual computer units.

20. A distributed processing system comprising:
a plurality of computing units, each having a first controller, wherein each of the computing units is operably connected to the first controller of each of the other computing units, wherein the first controller of each of the plurality of computing units communicates to each of the first controllers of the plurality of computing units through a first connection;
a second controller operably connected to the plurality of computing units through the first controller of each computing unit, wherein the second controller communicates to each of the first controllers of the plurality of computing units through a Universal Serial Bus compliant connection; and
a third controller operably connected to the second controller and communicating to the second controller through a third connection;
wherein at least one of the plurality of computing units is operably connected to at least one device selected from the group consisting of an input/out computing unit, a processor unit, a system management computing unit, a routing computing unit, an I2C low unit, an I2C high unit, and a bedrock computing unit; and
wherein the first controller comprises:
a first task manager for each one of the at least one devices operably connected between the pre-defined communication interface of the first controller and the at least one device;
a second task manager operably connected between the pre-defined communication interface and the Universal Serial Bus compliant connection; and
a first library for each one of the at least one devices operably connected between the pre-defined communication interface of the first controller and the at least one device.

21. The distributed processing system as in claim 20, wherein the pre-defined communication interface of the first controller accepts from the first task manager of the first controller information indicating at least one controller that the first task manager of the first controller will exchange information with exclusively.

22. The distributed processing system as in claim 20, wherein the I2C low unit, and the I2C high unit includes a power sensor of the individual computing unit, a temperature sensor of the individual computing unit, a cooling fan sensor, a voltage regulator module sensor, a heartbeat sensor, a password sensor, a CMOS sensor, a non-volatile random access memory sensor, a display sensor, a LED display sensor, a flash memory sensor.

23. The A distributed processing system comprising:
- a plurality of computing units, each having a first controller, wherein each of the computing units is operably connected to the first controller of each of the other computing units, wherein the first controller of each of the plurality of computing units communicates to each of the first controllers of the plurality of computing units through a RS-422 compliant connection;
- a second controller operably connected to the plurality of computing units through the first controller of each computing unit, wherein the second controller communicates to the first controllers of the plurality of computing units through a Universal Serial Bus compliant connection; and
- a third controller operably connected to the second controller and communicating to the second controller through an Ethernet compliant connection:
- the second controller also operably connected to at least one device selected from the group consisting of a display unit and a system management computing unit; and
- wherein the second controller comprises:
- a first task manager for each one of the at least one devices operably connected between the pre-defined communication interface of the second controller and the at least one device;
- a second task manager operably connected between the pre-defined communication interface and the Universal Serial Bus compliant connection; and
- a third task manager operably connected between the pre-defined communication interface and the Ethernet compliant connection.

24. The distributed processing system as in claim 23, wherein the pre-defined communication interface of the second controller accepts from the first task manager of the second controller information indicating at least one controller that the first task manager of the second controller will exchange information with exclusively.

25. The A distributed processing system comprising:
- a plurality of computing units, each having a first controller, wherein each of the computing units is operably connected to the first controller of each of the other computing units, wherein the first controller of each of the plurality of computing units communicates to each of the first controllers of the plurality of computing units through a first connection;
- a second controller operably connected to the plurality of computing units through the first controller of each computing unit, wherein the second controller communicates to each of the first controllers of the plurality of computing units through a second connection; and
- a third controller operably connected to the second controller and communicating to the second controller through an Ethernet compliant connection;
- the third controller also operably connected to at least one device selected from the group consisting of a display unit and a system management computing unit;
- wherein the third controller comprises:
- a first task manager for each one of the at least one devices operably connected between the pre-defined communication interface of the third controller and the at least one device; and
- a second task manager operably connected between the pre-defined communication interface and the Ethernet compliant connection.

26. The distributed processing system as in claim 25, wherein the pre-defined communication interface of the third controller accepts from the first task manager of the third controller information indicating at least one controller that the first task manager of the third controller will exchange information with exclusively.

27. A computer system comprising:
- at least two processing functional modules each including a processing unit adapted to process data and adapted to input/output data to other functional modules through at least two ports with each port including a plurality of data lines;
- at least one routing functional module adapted to route data and adapted to input/output data to other functional modules through at least two ports with each port including a plurality of data lines;
- at least one input or output functional module adapted to input or output data and adapted to input/output data to other functional modules through at least one port including a plurality of data lines;
- each processing, routing and input or output functional module including a local controller adapted to control the local operation of the associated functional module, wherein the local controller is adapted to input and output control information over control lines connected to the respective ports of its functional module;
- at least one system controller functional module adapted to communicate with one or more local controllers and provide control at a level above the local controllers;
- each of the functional modules adapted to be cabled together with a single cable that includes a plurality of data lines and control lines such that control lines in each module are connected together and data lines in each unit are connected together; and
- each of the local controllers adapted to detect other local controllers to which it is connected and to thereby collectively determine the overall configuration of a system.

* * * * *

UNITED STATES PATENT AND TRADEMARK OFFICE
CERTIFICATE OF CORRECTION

PATENT NO. : 6,845,410 B1
DATED : January 18, 2005
INVENTOR(S) : Brown et al.

It is certified that error appears in the above-identified patent and that said Letters Patent is hereby corrected as shown below:

Title page,
Item [75], Inventors, delete "Sunnyvale" and insert -- San Francisco --, therefor.
Item [63], Related U.S. Application Data, delete "Oct. 22, 1999" and insert -- Sept. 22, 1999 --, therefor.
Item [74], *Attorney, Agent of Firm,* delete "Woesser" and insert -- Woessner --, therefor.

Column 1,
Line 13, delete "Oct. 22, 1999" and insert -- Sept. 22, 1999 --, therefor.

Column 27,
Line 13, delete "The" before "A distributed".
Line 30, after "connection" delete ":" and insert -- ; --, therefor.
Line 54, delete "The" before "A distributed".

Signed and Sealed this

Twenty-first Day of June, 2005

JON W. DUDAS
*Director of the United States Patent and Trademark Office*